(12) United States Patent
Ogimura et al.

(10) Patent No.: US 7,568,571 B2
(45) Date of Patent: Aug. 4, 2009

(54) CONVEYOR DEVICE

(75) Inventors: Yoshio Ogimura, Hyogo-ken (JP);
Takayuki Kikuchi, Hyogo-ken (JP);
Kazuya Yuge, Hyogo-ken (JP);
Yoshinobu Ishikawa, Tokyo (JP)

(73) Assignee: Toshiba Elevator Kabushiki Kaisha, Tokyo (JP)

( * ) Notice: Subject to any disclaimer, the term of this patent is extended or adjusted under 35 U.S.C. 154(b) by 376 days.

(21) Appl. No.: 10/592,352

(22) PCT Filed: Mar. 17, 2005

(86) PCT No.: PCT/JP2005/005453
§ 371 (c)(1),
(2), (4) Date: Nov. 20, 2006

(87) PCT Pub. No.: WO2005/090221
PCT Pub. Date: Sep. 29, 2005

(65) Prior Publication Data
US 2007/0205079 A1    Sep. 6, 2007

(30) Foreign Application Priority Data
Mar. 23, 2004 (JP) .............................. 2004-085526
Sep. 9, 2004 (JP) .............................. 2004-262772

(51) Int. Cl.
*B66B 23/02* (2006.01)
(52) U.S. Cl. ....................................... 198/332; 198/330
(58) Field of Classification Search ................. 198/322, 198/323, 329, 330, 331, 332
See application file for complete search history.

(56) References Cited

U.S. PATENT DOCUMENTS

| 2,060,491 | A | * | 11/1936 | Dunlop ......................... 198/332 |
| 2,663,400 | A | * | 12/1953 | Margles et al. .............. 198/332 |
| 2,686,585 | A | * | 8/1954 | Margles et al. .............. 198/332 |
| 3,834,513 | A | | 9/1974 | Miura et al. |
| 4,498,890 | A | * | 2/1985 | Sutherland ................... 474/140 |
| 5,697,486 | A | * | 12/1997 | Krampl ....................... 198/332 |
| 6,382,388 | B1 | * | 5/2002 | Hirai et al. ................... 198/332 |
| 6,427,823 | B1 | * | 8/2002 | Ishikawa et al. ............ 198/330 |
| 6,834,754 | B2 | * | 12/2004 | Pietz ........................... 198/330 |

(Continued)

FOREIGN PATENT DOCUMENTS

EP      1 479 640 A1    11/2004

(Continued)

*Primary Examiner*—Douglas A Hess
(74) *Attorney, Agent, or Firm*—Foley & Lardner LLP

(57) ABSTRACT

In order to suppress speed irregularity of step rollers (5) in a passenger conveyor, a bent section (17) is formed in a step guide rail (3) and a restraining member (18) is provided upstream thereof, the shape of the height of the bent section (17) and the restraining member (18) is corrected beforehand by the amount of the compression of resilient members of the step rollers (5), which are formed with such resilient members around their shafts, by the compressive force acting between the bent section (17) and restraining member (18). Thus generation of speed irregularity of the steps (4) is suppressed and passenger comfort is improved. Also, by providing a recess (3aa) in the step guide rail (3), gripping of the step rollers (5) as they execute rolling movement along the undersurface of the restraining member (18) from below can be avoided, thereby preventing damage to the step rollers (5), restraining member (18) and step guide rail (3).

20 Claims, 18 Drawing Sheets

U.S. PATENT DOCUMENTS

| | | | |
|---|---|---|---|
| 7,011,207 B2 * | 3/2006 | Suzuki et al. | 198/838 |
| 7,077,257 B2 * | 7/2006 | Pietz | 198/334 |
| 7,159,705 B2 * | 1/2007 | Ogimura et al. | 198/326 |
| 7,296,671 B2 * | 11/2007 | Pietz | 198/330 |
| 7,401,691 B2 * | 7/2008 | Ishikawa et al. | 198/330 |
| 2006/0108196 A1 | 5/2006 | Ishikawa et al. | |

FOREIGN PATENT DOCUMENTS

| | | |
|---|---|---|
| JP | 48-002689 | 1/1973 |
| JP | 48-067986 | 9/1973 |
| JP | 8-145125 A | 6/1996 |
| JP | 2003-252560 A | 9/2003 |
| WO | WO 03/072481 A1 | 9/2003 |

\* cited by examiner

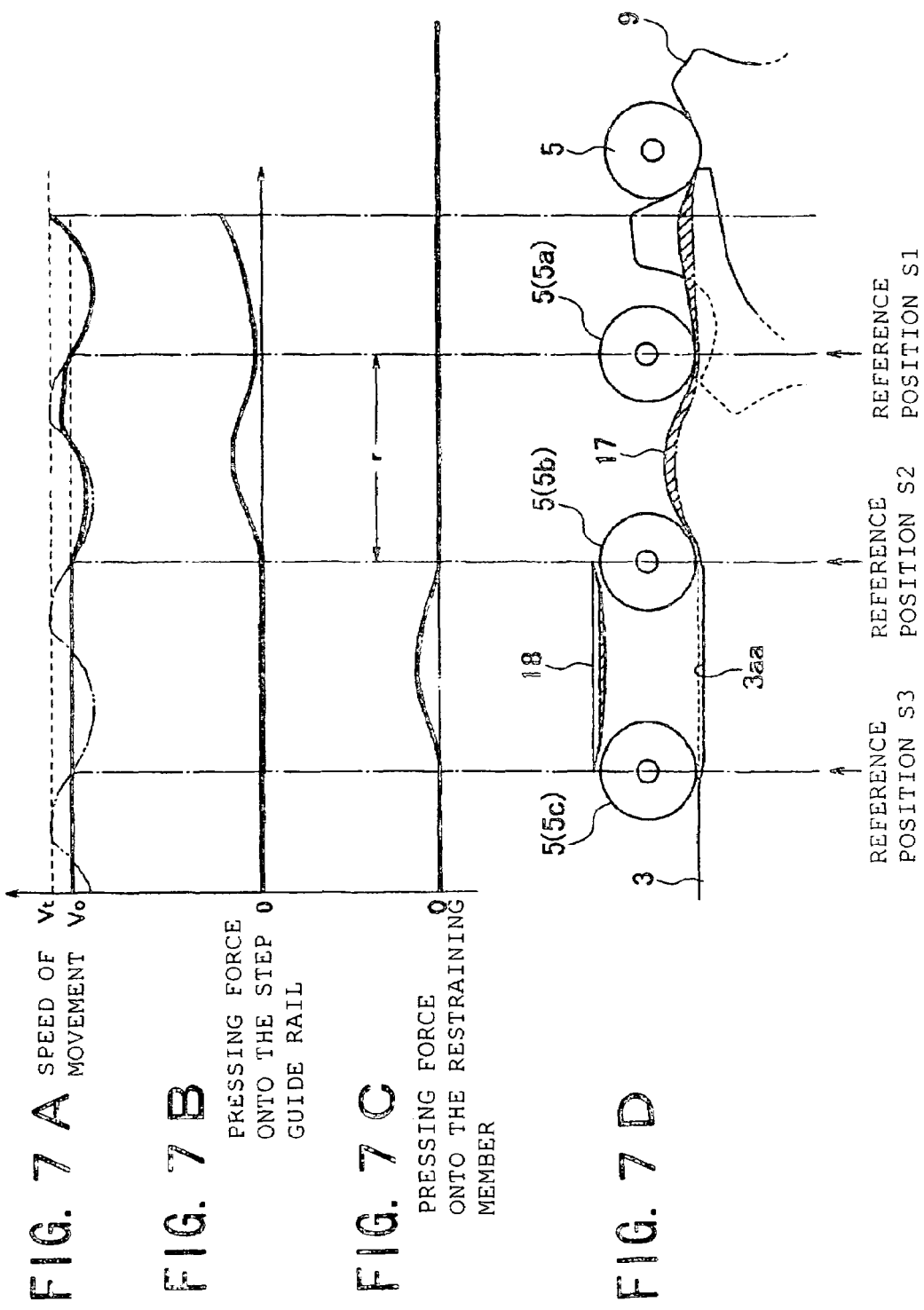

REFERENCE POSITION S3

REFERENCE POSITION S2

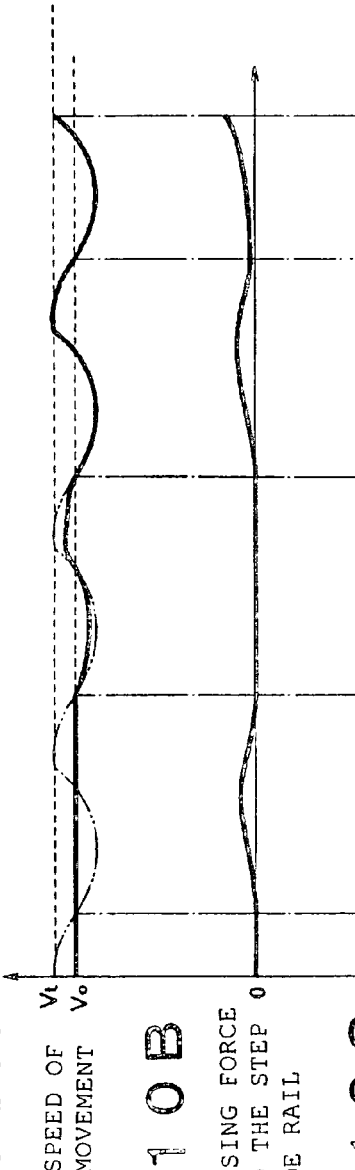
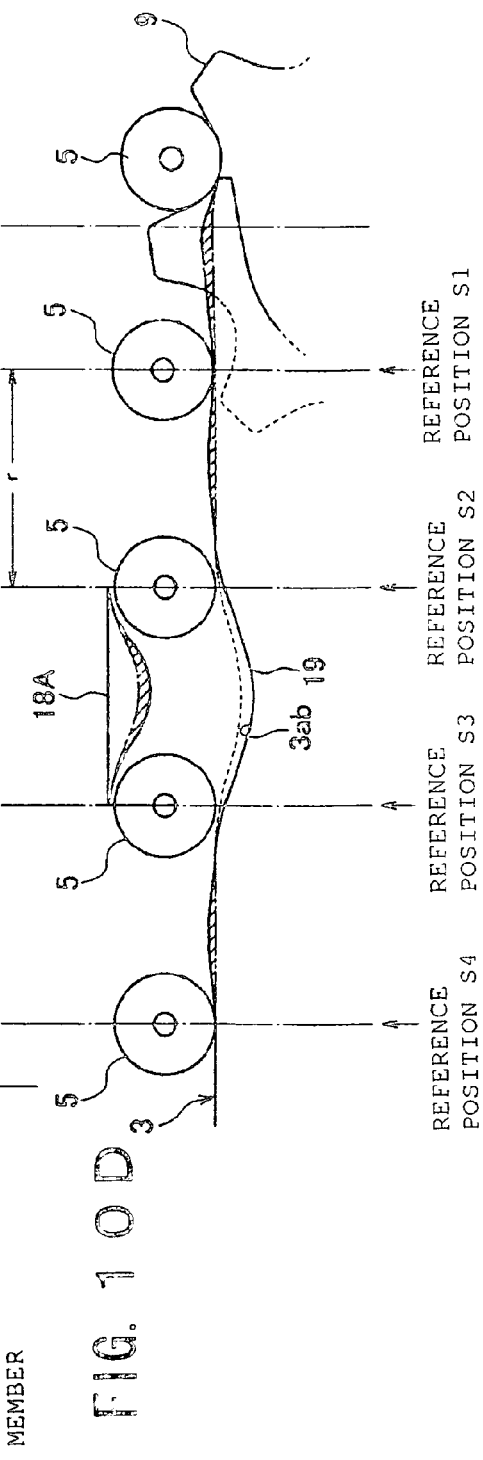
FIG. 10A SPEED OF MOVEMENT
FIG. 10B PRESSING FORCE ONTO THE STEP GUIDE RAIL
FIG. 10C PRESSING FORCE ONTO THE RESTRAINING MEMBER
FIG. 10D

REFERENCE POSITION S2

REFERENCE POSITION S1

REFERENCE POSITION

REFERENCE POSITION S2

REFERENCE POSITION S1

CONVEYOR DEVICE

TECHNICAL FIELD

The present invention relates to a conveyor such as an escalator or moving walkway (moving walk or moving walk road).

BACKGROUND ART

A conveyor such as an escalator or moving walkway has a plurality of steps that are provided with step rollers and is arranged such that these steps are driven by a chain drive mechanism to perform circulatory movement between a passenger entrance and passenger exit whilst supported and guided by a step guide rail.

In the case of a moving walkway, typically a plurality of steps move in the horizontal direction. These steps are sometimes specifically referred to as "foot boards", but, in the present specification, will be referred to by the general term of "steps" in the case of a moving walkway also.

Typically, the chain drive mechanism is of a type in which the returning extremity of a step chain that links in endless fashion step rollers with a prescribed pitch (link length r) is wound onto a driving sprocket wheel (sometimes called master driving sprocket wheel) that is rotated by receiving drive force from a drive motor, the drive force of the motor being thus transmitted to the step chain. This chain drive mechanism is usually arranged within a structure called a truss in the center of the passenger entrance or in the vicinity of the passenger exit of the conveyor.

While it was conventionally considered that ample space was necessary for installation of the truss in which the chain drive mechanism is arranged, in recent years, reduction of the size of the truss is being called for and attempts are being made to save space by reducing the overall thickness of the conveyor.

If, in conformity with the reduction in size of the truss, a sprocket wheel of small diameter is employed for the driving sprocket wheel, comparatively large speed irregularities are generated in the step rollers that are linked with the step chain; these speed irregularities appear as vibration of the steps, adversely affecting the comfort of passengers on the conveyor.

The present applicants therefore first proposed a conveyor of a construction such as would enable generation of speed irregularity in the step rollers to be reduced. An example of such a construction is Laid-open Japanese Patent Publication (Tokkai 2003-252560).

FIG. 1 to FIG. 3 are layout diagrams of a prior art conveyor. The conveyor 1 is a moving walkway arranged practically horizontally with respect to a road surface and provided with a step guide rail 3 that makes a circuit between a passenger entrance 1a and passenger exit 1b in the interior of a structure 2 called a truss. This step guide rail 3 is constituted so as to guide the movement of a plurality of steps 4.

The plurality of steps 4 are provided with respective step rollers 5, these step rollers 5 being moved along the step guide rail 3.

The step guide rail 3 includes a main rail body 3a having a supporting face on its outgoing path side and a restraining rail 3b provided on its return side. As the steps 4 move along the outgoing path side the steps 4 move in the direction of the arrow A from the passenger entrance 1a towards the passage exit 1b. A rubber plate 6 is provided in the vicinity of the passenger entrance 1a and passenger exit 1b. The steps 4 move in the downward direction of this rubber plate 6.

As the steps 4 move along the return side the step rollers 5 move between the main rail body 3a and the restraining rail 3b from the passenger entrance 1b towards the passenger exit 1a. Also, at the side of the passenger entrance 1a, a moveable rail 3c is provided that is capable of movement in a direction such as to separate from this main rail body 3a.

Since the step rollers 5 of the steps 4 that are mutually linked with a prescribed pitch (link length r) are driven in a condition in abutment with the step guide rail 3, the steps 4 are guided by the step guide rail 3 and can move without a gap continuously between the passenger entrance 1a and passenger exit 1b.

Since the returning portion of the step chain 7 is wound onto the driving sprocket wheel 9 that is rotated by receiving drive force from the drive motor 8, the chain drive mechanism transmits the drive force of the drive motor 8 to the step chain 7 through the drive chain 10 and the driving sprocket wheel 9.

Specifically, the drive chain 10 and drive motor 8 constitute a rotary drive device. The driving sprocket wheel 9, having received drive force from this rotary drive device, is operated to feed the step chain 7 and the step rollers 5 linked therewith in a condition meshed with the step rollers 5 that are linked by the step chain 7 between one and another adjacent tooth.

A driven sprocket wheel (sometimes called slave sprocket wheel) 11 of practically the same diameter as the driving sprocket wheel (sometimes called master sprocket wheel) 9 and that rotates driven by the driving sprocket wheel 9 is provided at the side of the passenger entrance 1a of the conveyor 1. The step chain 7 is passed over this driven sprocket wheel 11 and driving sprocket wheel 9 from the driven sprocket wheel 11 to the driving sprocket wheel 9.

The driven sprocket wheel 11 is biased in a direction such as to separate from the driving sprocket wheel 9, by means of a spring member 12 of a chain tensioning mechanism so as to tension the step chain 7 in the horizontal direction to prevent slackness in the direction of feed. A moveable rail 3c of the step guide rail 3 is also moved in a direction such as to separate from the driving sprocket wheel 9, in a manner that is linked with the driven sprocket wheel 11.

The step rollers 5 mesh with the driving sprocket wheel 9 in the process of changing over from linear motion in the horizontal direction following the step guide rail 3 to curvilinear motion that executes rotation with the diameter of the driving sprocket wheel 9. This gives rise to irregularities in the speed of movement.

This speed irregularity that is generated in the step rollers 8 gives rise to vibration in the steps 4, which adversely affects passenger comfort of the passengers on the conveyor 1. A hill-shaped curved section 13 that absorbs such speed irregularity of the step rollers 5 is therefore provided in the vicinity of the driving sprocket wheel 9 on the outgoing path side of the main rail body 3a, in the vicinity of the driving sprocket wheel 9 of the restraining rail 3b that is provided on the return side of the step guide rail 3 and in the vicinity of the driven sprocket wheel 11 on the outgoing path side and return side of the moveable rail 3c.

The step rollers 5 pass along a track corresponding to the shape of these hill-shaped bent sections 13. Recesses 14 are respectively provided in positions facing the bent sections 13 so as to enable movement of the step rollers 5 along these bent sections 13.

Furthermore, a restraining member 15 that abuts the upper edge of the step rollers 5 is provided in a position facing the step guide rail 3, in order to prevent occurrence of riding up of the next step roller 5, due to the effect of the preceding step roller 5 passing over the bent section 13, at a position facing a location upstream of the bent section 13 provided in the vicinity of the driving sprocket wheel 9 on the side of the outgoing path of the main rail body 3a.

Such a restraining member 15 is likewise provided in a position facing a position downstream of the bent section 13 that is provided in a position in the vicinity of the driven sprocket wheel 11 on the side of the outgoing path of the moveable rail 3c.

Speed irregularity i.e. vibration that is generated in the steps 4 can thus be suppressed by making the movement of the step rollers 5 smooth, even in the case of reverse drive of the conveyor 1, by providing a bent section 13 in a location in the vicinity of the driving sprocket wheel 9 of the restraining rail 3b provided on the return side of the step guide rail 3.

It should be noted that even if the shape of the bent section 13 is valley-shaped rather than hill-shaped, speed irregularities of the step rollers 5 can be absorbed in the same way.

In a conveyor as described above, consideration may be given to interposing resilient members having flexibility made of for example rubber on the outside around the rotary shaft of the step rollers 5, in order to prevent generation of noise during the rotation of the step rollers 5.

The tensile force of a chain tensioning mechanism such as the spring member 12 acts so as to effect advancement in the horizontal direction in the straight-line section on the step rollers 5 on the step guide rail 3, so a large pressing force pressing these hill-shaped bent sections 13 onto the step rollers 5 acts when the step rollers 5 attempt to cross the hill-shaped bent section 13 formed on the step guide rail 3.

If a resilient member is interposed around the shaft of the step roller 5, the pressing force that is exerted when the step roller passes this bent section 13 acts in the radial direction of the step roller 5, compressing the resilient member. There is therefore a risk that the track of the movement of the shafts of the step rollers, following the shape of the bent section 13, may depart from the track that was set beforehand with a view to suppressing speed irregularity, with the result that the desired diminution of speed irregularity may not be obtained.

The same applies when the bent section 13 formed on the step guide rail 3 is valley-shaped. When the bent section is valley-shaped, pressing force is applied in the same way between this bent section and the restraining members of projecting shape projecting downwards that are arranged facing this bent section so as to enable the step rollers 5 to follow a predetermined track along the shape of the valley-shaped bent section 13. Thus the resilient member of the step rollers 5 is compressed in the radial direction, with the risk that speed irregularities may not be adequately suppressed.

Also, although, in a prior art conveyor, a restraining member 15 was provided in a position facing the step guide rail 3 in order to prevent the step rollers located to the downstream (i.e. on the side nearest the passenger entrance 1a) of the hill-shaped bent section 13 from riding upwards, as the step rollers 5 are thus gripped from above and below by the restraining member 15 and the step guide rail 3, causing the step rollers 5 to move in sliding fashion rather than rotating, there was a risk that the resulting sliding friction would damage not just the step rollers 5 themselves but rather both the restraining member 15 and the step rollers 5.

If, on the other hand, in order to prevent such sliding, a gap was provided between the restraining member 15 and the step rollers 5, this resulted in the movement of the step rollers 5 being displaced in position towards the restraining member 15 by the amount of this gap, with the risk that speed irregularities would thereby be increased.

Also, in the prior art conveyor, if the step chain upstream and downstream of the step roller 5 extends in a straight line at the connecting section with the hill-shaped or valley-shaped bent section 13, some degree of bending must take place at this connecting section in order for the subsequent step roller 5 to be able to track the change of speed when the step roller 5 passes the connecting section to the hill-shaped or valley-shaped bent section 13 and this gives rise to a risk of generation of dynamic shock vibration when the step rollers 5 pass this point.

Accordingly, a first object of the present invention is to provide a conveyor wherein generation of speed irregularities in the steps can be adequately suppressed even if a resilient member is interposed around the shaft of the step rollers and the diameter thereof is compressed by pressing force.

Also, an object is to provide a conveyor wherein generation of speed irregularities between step roller and step can be adequately suppressed while suppressing damage to the step rollers etc by avoiding gripping of the running step rollers from above and below.

Also, a second object of the present invention is to provide a conveyor wherein generation of speed irregularities between the step roller and the step can be adequately suppressed without generating dynamic shock vibration during passage of the step rollers over the connecting section to the hill-shaped or valley-shaped bent section.

DISCLOSURE OF INVENTION

In order to achieve the above object, a conveyor according to the present invention is constructed as follows. Specifically, according to the present invention a conveyor comprises: a plurality of steps having a step roller; a step chain linking the step rollers with a prescribed pitch; a rotary drive device that generates drive force for moving the steps in a prescribed direction; a driving sprocket wheel that is rotated by receiving the drive force of this rotary drive device and that transmits drive force to the step chain; a step guide rail whereby, if the pitch circle speed of this driving sprocket wheel is defined as Vt, the average speed of a step roller that is moved linked with the step chain is defined as Vo, and positions at which the speed of the step roller decreases from Vt to Vo are defined as reference positions, the step rollers are guided by providing a hill-shaped bent section between a reference position, of the plurality of reference positions that exist, positioned in the vicinity of the driving sprocket wheel and another reference position adjacent to this reference position; and a restraining member provided so as to abut the step roller in a position facing a position upstream of the location where the hill-shaped bent section is provided;

wherein the step rollers are formed having a resilient member about the shaft and the step guide rail is formed with the height of the central region of said hill-shaped bent section elevated by an amount corresponding to the amount of compression of the resilient member of the step roller in the radial direction.

Next, according to the present invention a conveyor comprises: a plurality of steps having a step roller; a step chain linking the step rollers with a prescribed pitch; a rotary drive device that generates drive force for moving the steps in a prescribed direction; a driving sprocket wheel that is rotated by receiving the drive force of this rotary drive device and that transmits drive force to the step chain; a step guide rail whereby, if the pitch circle speed of this driving sprocket wheel is defined as Vt, the average speed of the step roller that is moved linked with the step chain is defined as Vo, and positions at which the speed of the step roller decreases from Vt to Vo are defined as reference positions, the step rollers are guided by providing a hill-shaped bent section between the reference position, of the plurality of reference positions that exist, positioned in the vicinity of the driving sprocket wheel and a drive starting point on the driving sprocket wheel separated by the link length of the step chain from this reference position; and a restraining member provided so as to abut the step roller in a position facing a position upstream of the location where the hill-shaped bent section is provided;

wherein the step rollers are formed having a resilient member about the shaft and the step guide rail is formed with the height of the central region of said hill-shaped bent section elevated by an amount corresponding to the amount of compression of the resilient member in the radial direction of the step roller.

Next, according to the present invention a conveyor comprises: a plurality of steps having a step roller; a step chain linking the step rollers with a prescribed pitch; a rotary drive device that generates drive force for moving the steps in a prescribed direction; a driving sprocket wheel that is rotated by receiving the drive force of this rotary drive device and that transmits drive force to the step chain; a step guide rail whereby, if the pitch circle speed of this driving sprocket wheel is defined as Vt, the average speed of said step roller that is moved linked with the step chain is defined as Vo, and positions at which the speed of the step roller decreases from Vt to Vo are defined as reference positions, the step rollers are guided by providing a valley-shaped bent section between a reference position, of the plurality of reference positions that exist, positioned in the vicinity of the driving sprocket wheel and another reference position adjacent to this reference position; and a restraining member provided so as to abut the step roller in a position facing the valley-shaped bent section;

wherein the step rollers are formed having a resilient member about the shaft and the restraining member is formed with the height of the central region thereof elevated towards the valley-shaped bent section by an amount corresponding to the amount of compression of said resilient member in the radial direction of the step roller.

Next, according to the present invention a conveyor comprises: a plurality of steps having a step roller; a step chain linking the step rollers with a prescribed pitch; a rotary drive device that generates drive force for moving the steps in a prescribed direction; a driving sprocket wheel that is rotated by receiving the drive force of this rotary drive device and that transmits drive force to the step chain; a step guide rail whereby, if the pitch circle speed of this driving sprocket wheel is defined as Vt, the average speed of said step roller that is moved linked with the step chain is defined as Vo, and positions at which the speed of the step roller decreases from Vt to Vo are defined as reference positions, the step rollers are guided by providing a hill-shaped bent section between a reference position, of the plurality of reference positions that exist, positioned in the vicinity of the driving sprocket wheel and another reference position adjacent to this reference position; and a restraining member provided so as to abut the step roller in a position facing a location upstream of the location where the hill-shaped bent section is provided;

wherein the step guide rail is formed with a recess in its surface facing the restraining member.

Next, according to the present invention a conveyor comprises: a plurality of steps having a step roller; a step chain linking the step rollers with a prescribed pitch; a rotary drive device that generates drive force for moving the steps in a prescribed direction; a driving sprocket wheel that is rotated by receiving the drive force of this rotary drive device and that transmits drive force to the step chain; a step guide rail whereby, if the pitch circle speed of this driving sprocket wheel is defined as Vt, the average speed of said step rollers that are moved linked with the step chain is defined as Vo, and positions at which the speed of the step roller decreases from Vt to Vo are defined as reference positions, the step rollers are guided by providing a valley-shaped bent section between a reference position, of the plurality of reference positions that exist, positioned in the vicinity of the driving sprocket wheel and another reference position adjacent to this reference position; and a restraining member provided so as to abut the step roller in a position facing the valley-shaped bent section;

wherein the step guide rail is formed with a recess in the valley-shaped bent section.

Next, according to the present invention a conveyor comprises: a plurality of steps having a step roller; a step chain linking the step rollers with a prescribed pitch; a rotary drive device that generates drive force for moving the steps in a prescribed direction; a driving sprocket wheel that is rotated by receiving the drive force of this rotary drive device and that transmits drive force to the step chain; a step guide rail whereby, if the pitch circle speed of this driving sprocket wheel is defined as Vt, the average speed of said step rollers that are moved linked with the step chain is defined as Vo, and positions at which the speed of the step roller decreases from Vt to Vo are defined as reference positions, the step rollers are guided by providing a hill-shaped bent section between the reference position, of the plurality of reference positions that exist, positioned in the vicinity of the driving sprocket wheel and a drive starting point on the driving sprocket wheel separated by the link length of the step chain from this reference position; and a restraining member provided so as to abut the step roller in a position facing a position upstream of the location where the hill-shaped bent section is provided; wherein the step guide rail is formed with a recess in its surface facing the restraining member.

Further, according to the present invention a conveyor comprises: a plurality of steps having a step roller; a step chain linking the step rollers with a prescribed pitch; a rotary drive device that generates drive force for moving the steps in a prescribed direction; a driving sprocket wheel that is rotated by receiving the drive force of this rotary drive device and that transmits drive force to the step chain; a step guide rail whereby, if the pitch circle speed of this driving sprocket wheel is defined as Vt, the average speed of said step roller that is moved linked with the step chain is defined as Vo, and positions at which the speed of the step roller decreases from Vt to Vo are defined as reference positions, the step rollers are guided by providing a hill-shaped bent section between a reference position, of the plurality of reference positions that exist, positioned in the vicinity of the driving sprocket wheel and another reference position adjacent to this reference position; and a restraining member provided so as to abut the step roller in a position facing the hill-shaped bent section;

wherein the height of the step guide rail is offset to less than the height at the hill-shaped bent section on the side of the hill-shaped bent section further from the driving sprocket wheel.

Next, according to the present invention a conveyor comprises: a plurality of steps having a step roller; a step chain linking the step rollers with a prescribed pitch; a rotary drive device that generates drive force for moving the steps in a prescribed direction; a driving sprocket wheel that is rotated by receiving the drive force of this rotary drive device and that transmits drive force to the step chain; a step guide rail whereby, if the pitch circle speed of this driving sprocket wheel is defined as Vt, the average speed of said step roller that is moved linked with the step chain is defined as Vo, and positions at which the speed of the step roller decreases from Vt to Vo are defined as reference positions, the step rollers are guided by providing a hill-shaped bent section between a reference position, of the plurality of reference positions that exist, positioned in the vicinity of the driving sprocket wheel and another reference position adjacent to this reference position; and a restraining member provided so as to abut the step roller in a position facing the hill-shaped bent section;

wherein the step guide rail is folded so as to constitute a hill fold in practically the center of the hill-shaped bent section.

Next, according to the present invention a conveyor comprises: a plurality of steps having a step roller; a step chain linking the step rollers with a prescribed pitch; a rotary drive device that generates drive force for moving the steps in a prescribed direction; a driving sprocket wheel that is rotated by receiving the drive force of this rotary drive device and that transmits drive force to the step chain; a step guide rail whereby, if the pitch circle speed of this driving sprocket wheel is defined as Vt, the average speed of said step roller that is moved linked with the step chain is defined as Vo, and positions at which the speed of the step roller decreases from Vt to Vo are defined as reference positions, the step rollers are guided by providing a valley-shaped bent section between a reference position, of the plurality of reference positions that exist, positioned in the vicinity of the driving sprocket wheel and another reference position adjacent to this reference position; and a restraining member provided so as to abut the step roller in a position facing the valley-shaped bent section;

wherein the step guide rail is folded so as to constitute a valley fold in practically the center of said valley-shaped bent section.

BRIEF DESCRIPTION OF DRAWINGS

FIG. 5A is a view showing change of speed of movement corresponding to position of a step roller.

FIGS. 7A, B, C and D are views given in explanation of the speed of movement of the step roller when a resilient member is interposed around the shaft of the step roller; the pressing force acting between the step roller and the step guide rail, and the restraining member; and the shape of the step roller and step guide rail and the restraining member in the conveyor shown in FIG. 4: in particular, FIG. 7A is a view showing the change of the speed of movement on the position of the step roller; FIG. 7B is a diagram of the pressing force of the step roller acting on the step guide; FIG. 7C is a diagram of the pressing force of the step roller acting on the restraining member; and FIG. 7D is a diagram showing how the shape of the bent section and the shape of the restraining member correspond with the step rollers that are provided with resilient members;

FIGS. 10A, B, C and D show a second embodiment of a conveyor according to the present invention: in particular, FIG. 10A is a view showing change of speed of movement corresponding to position of a step roller, FIG. 10B is a diagram of the pressing force of the step roller acting on the step guide rail, FIG. 10C is a diagram of the pressing force of the step roller acting on the restraining member, and FIG. 10D is a diagram showing how the shape of the bent section and the shape of the restraining member correspond with the step rollers that are provided with resilient members;

FIG. 12A is a view showing change of speed of movement corresponding to step roller position.

FIG. 14A is a view showing the dependence of the speed of movement on the position of the step roller.

Figure 17:
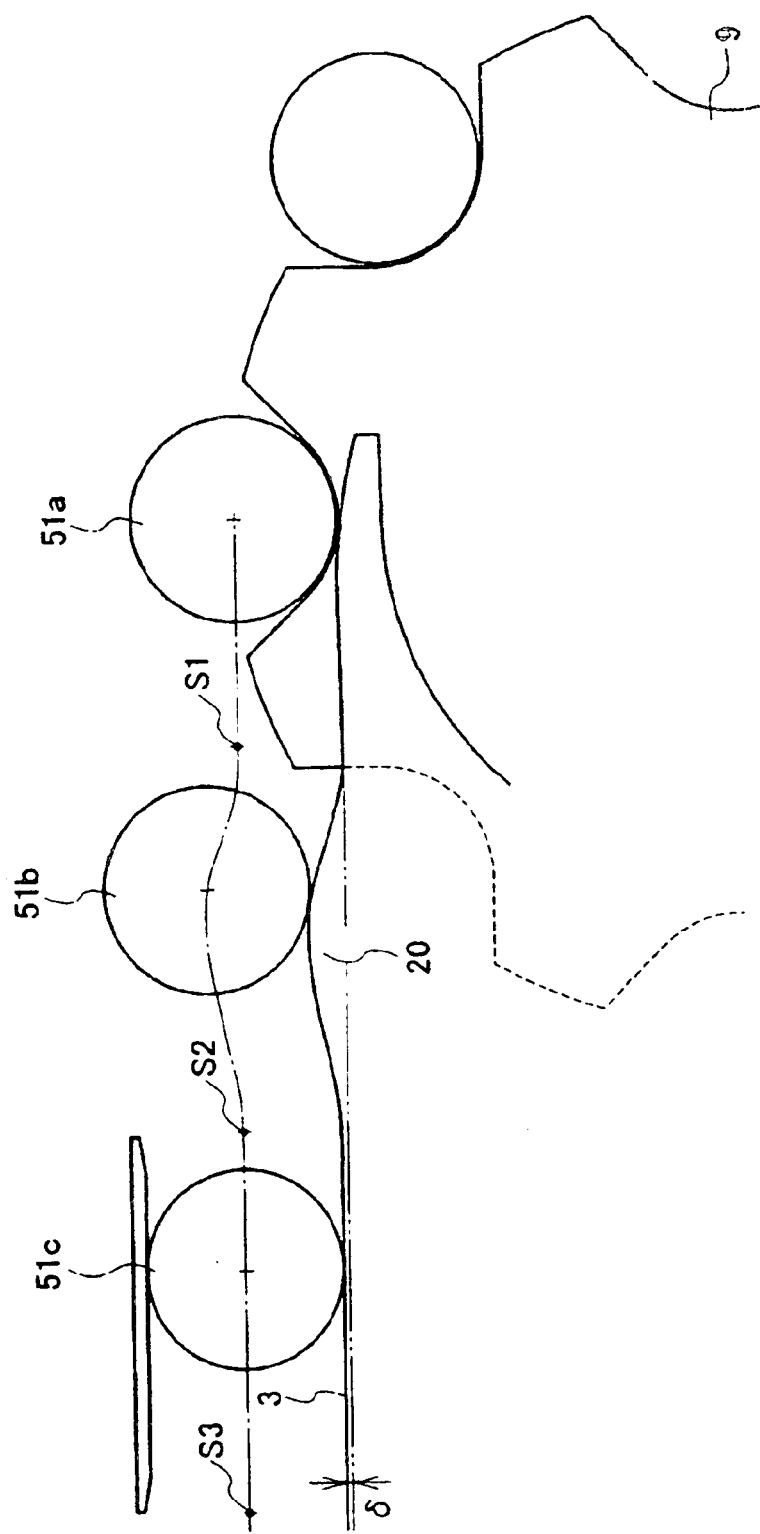
FIG. 17 is a layout diagram showing a fourth embodiment of a conveyor according to the present invention.
Figure 18:
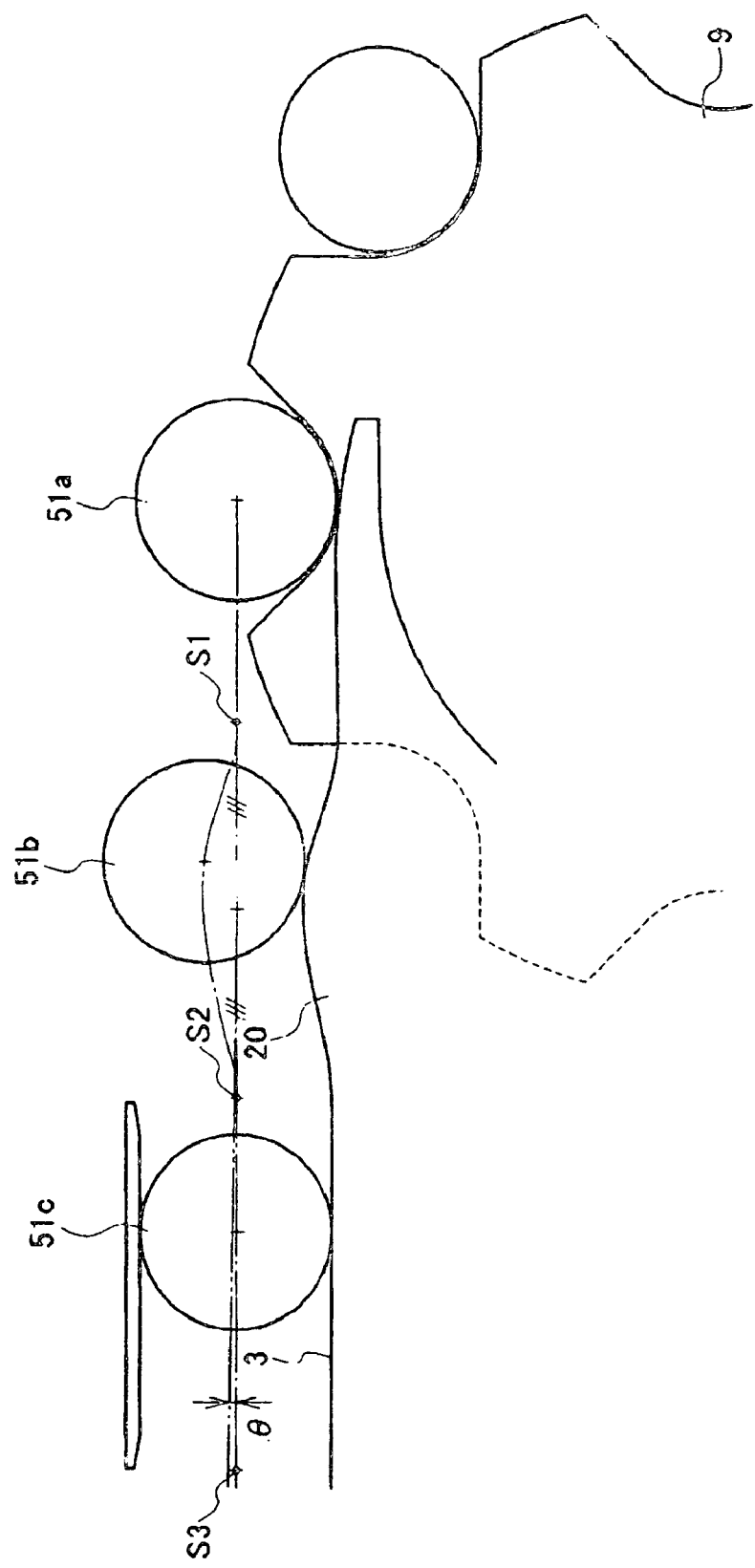
FIG. 18 is a layout diagram showing a fifth embodiment of a conveyor according to the present invention.
Figure 19:
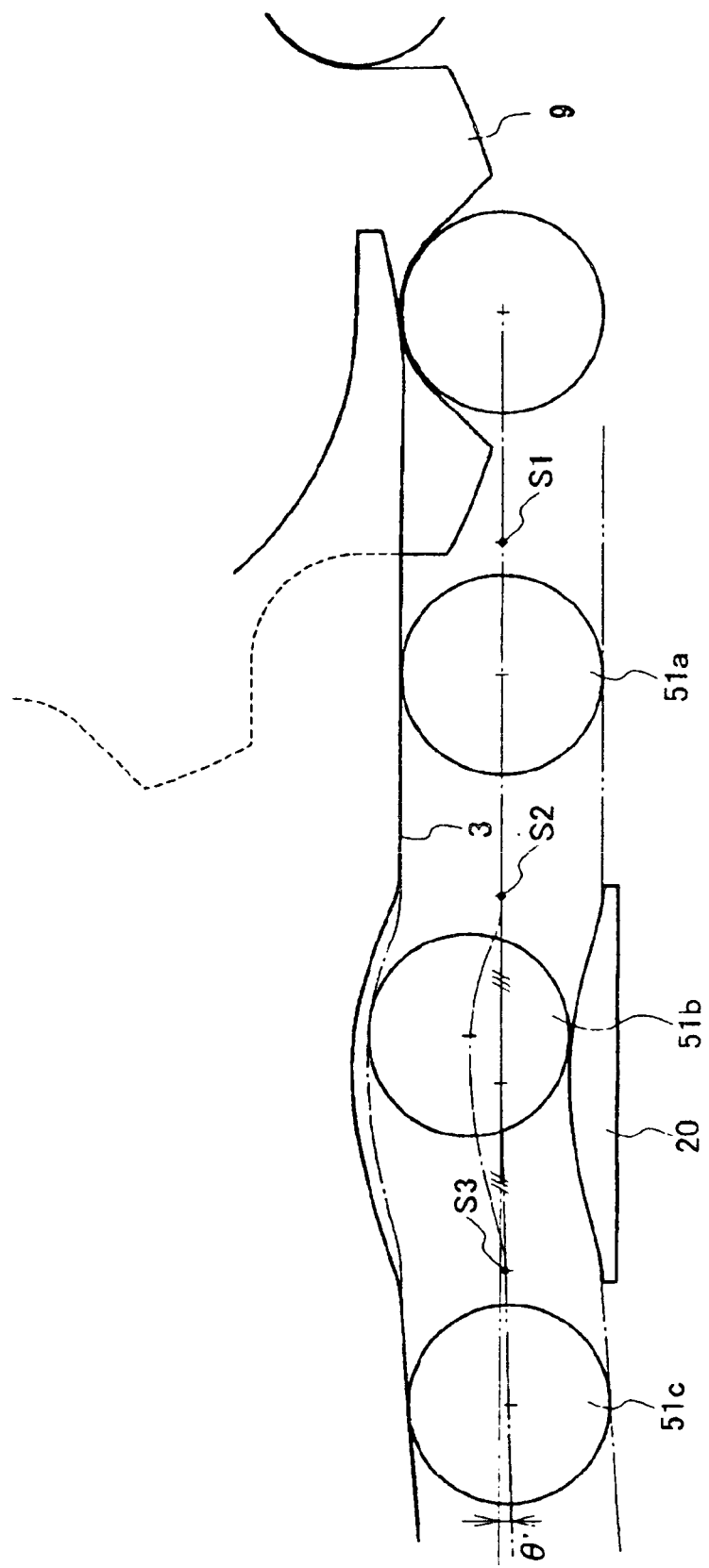
FIG. 19 is a layout diagram showing a sixth embodiment of a conveyor according to the present invention.

The driving sprocket wheel 9 is clockwise rotating in FIG. 17 and FIG. 18 but, in contrast to these Figures, is anticlockwise rotating in FIG. 19.

BEST MODE FOR CARRYING OUT THE INVENTION

Figure 1:
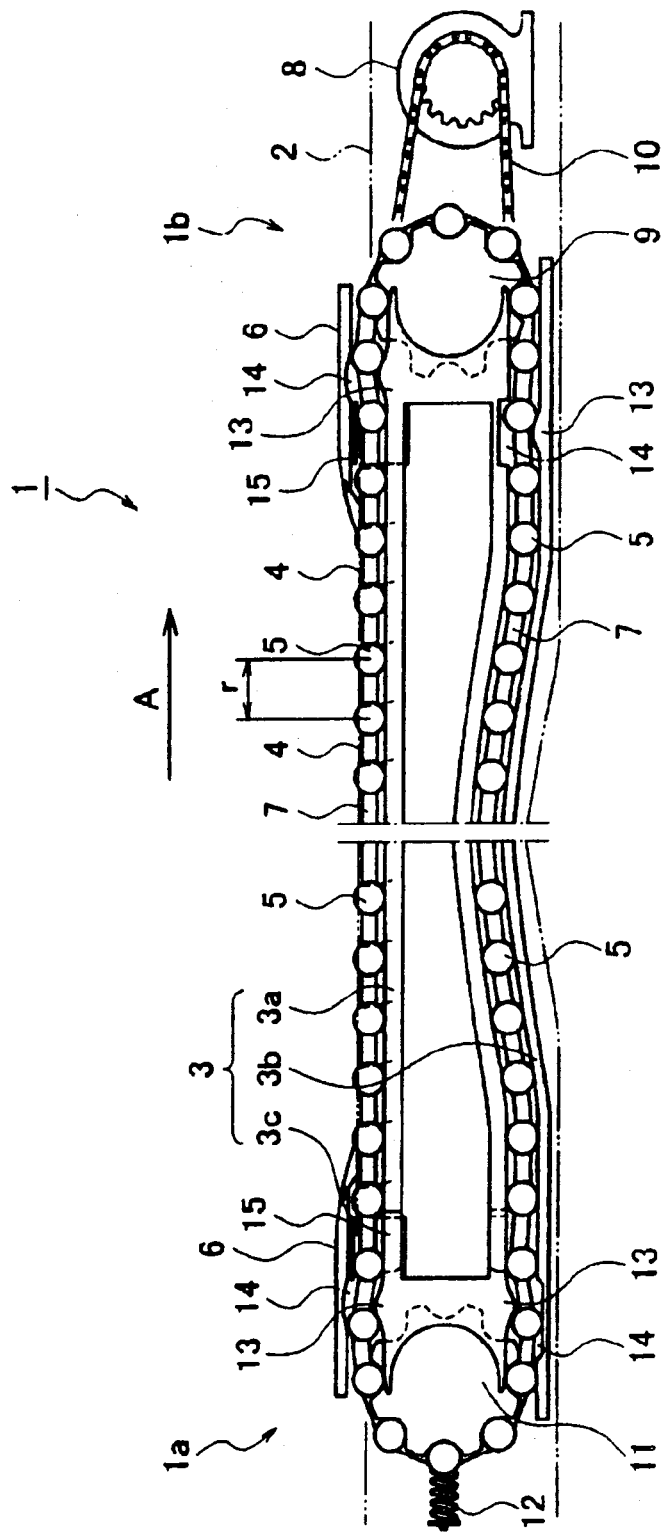
FIG. 1 is a layout diagram of a prior art conveyor.
Figure 2:
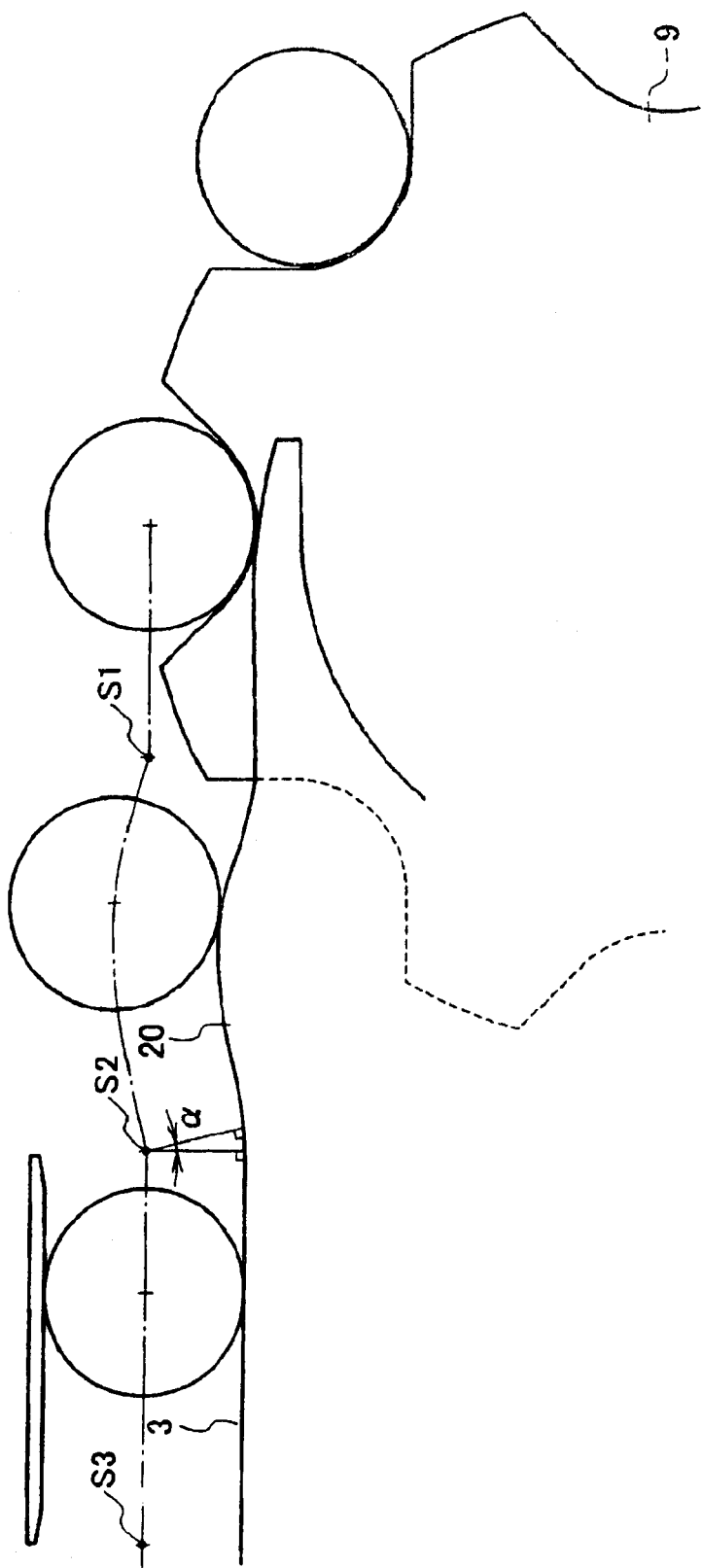
FIG. 2 is a layout diagram of prior art conveyor.
Figure 3:
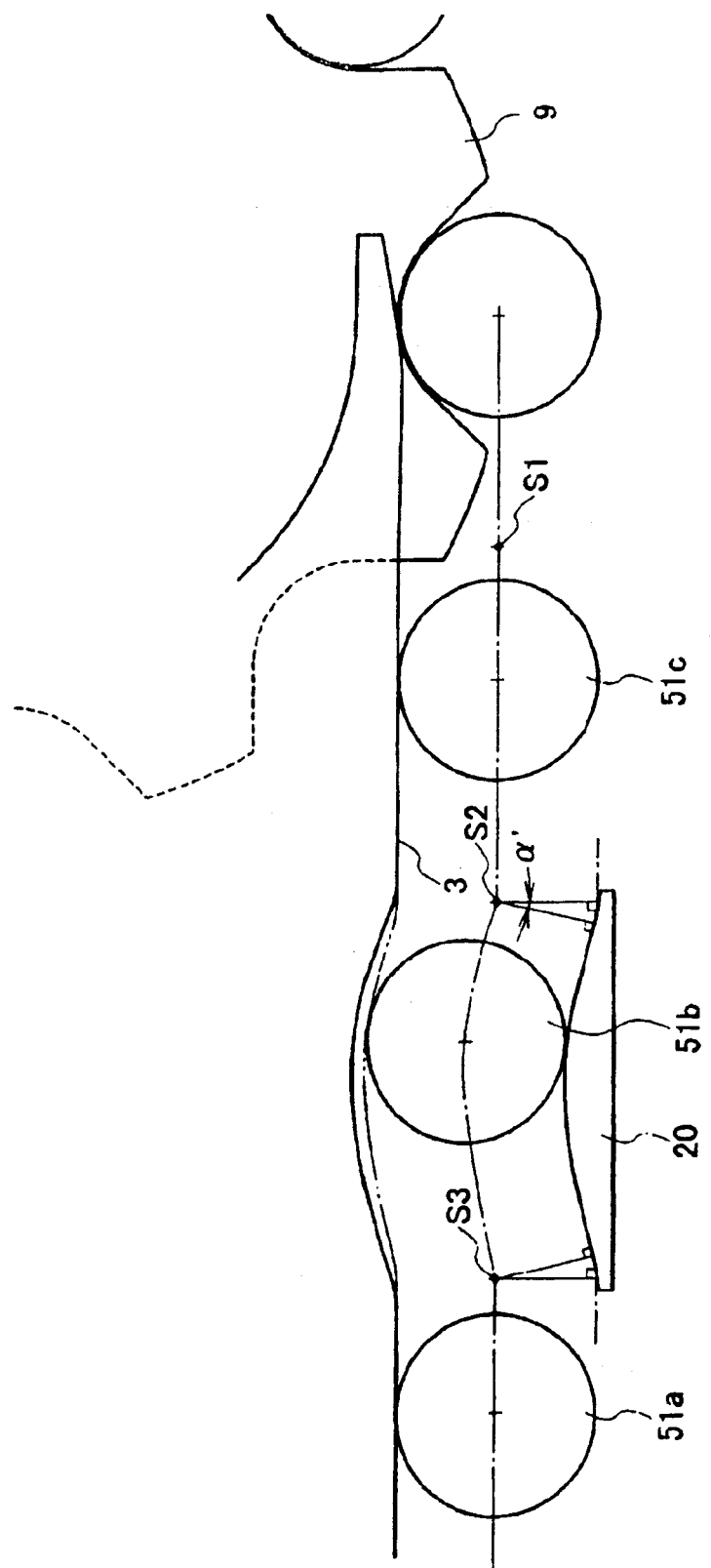
FIG. 3 is a layout diagram of a prior art conveyor.

Embodiments of a conveyor according to the present invention are described below in detail with reference to FIG. 4 to FIG. 19. Items which are the same as in the prior art layouts shown in FIG. 1 to FIG. 3 are given the same reference symbols and further detailed description thereof is omitted.

First Embodiment

A first embodiment of a conveyor according to the present invention is described with reference to FIG. 4 to FIG. 8.

Figure 4:
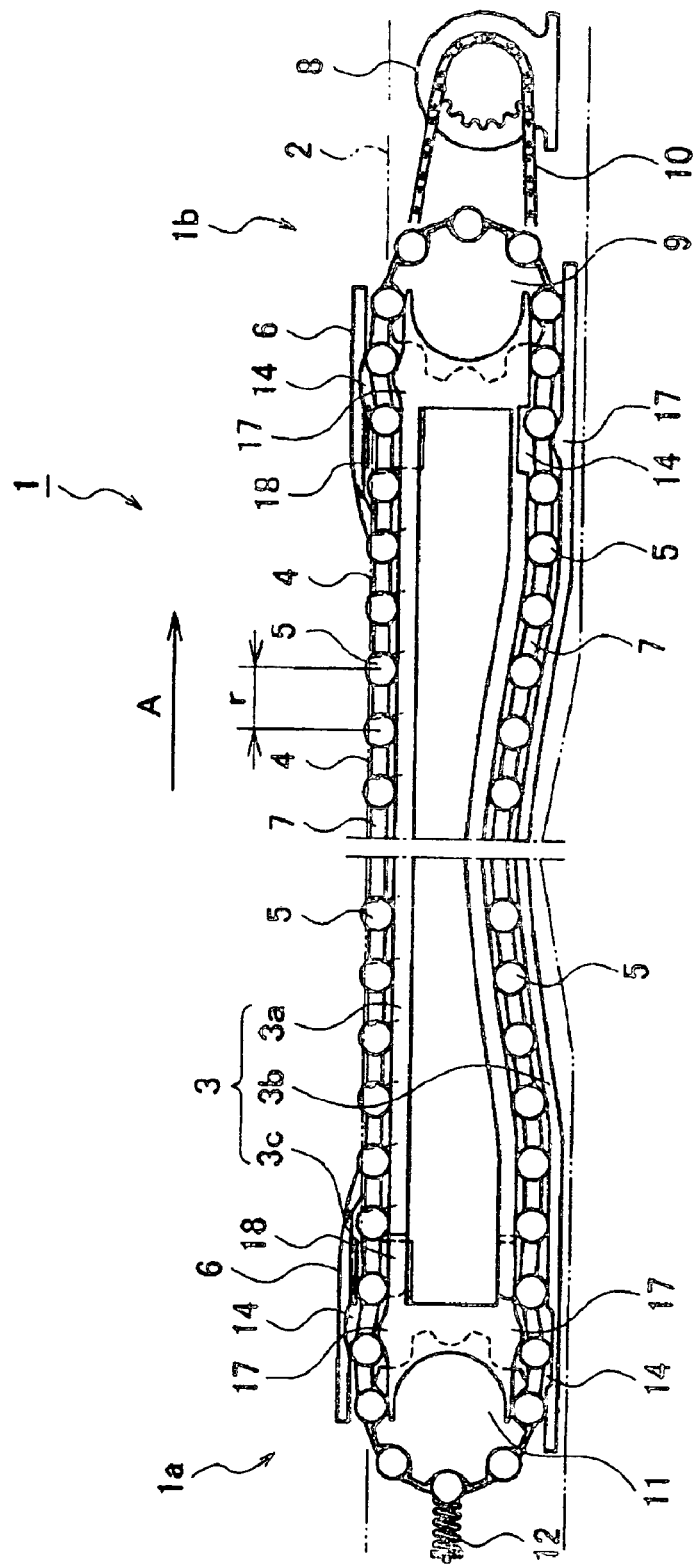
FIG. 4 is a layout diagram showing a first embodiment of a conveyor according to the present invention.

As shown in FIG. 4, in the conveyor 1 according to a first embodiment, step rollers 5 are moved along a step guide rail 3, the step rollers 5 being linked to a step chain 7 with a prescribed pitch (link length r).

A driving sprocket wheel 9 over which passes a step chain 7 is rotated by receiving drive force of a drive motor 8 and drive chain 10 constituting a rotary drive device and the steps 4 thus convey passengers by moving in the direction of the arrow A, which is the direction of passenger conveyance.

A hill-shaped bent section 17 for absorbing speed irregularities in the step rollers 5 or for suppressing occurrence of speed irregularities is provided in the vicinity of the driving sprocket wheel 9 on the outgoing path side of a main rail body 3a, and/or in the vicinity of the driving sprocket wheel 9 of a pressing rail 3b, and in the vicinity of a driven sprocket wheel 11 on the outgoing path side and return side of a moveable rail 3c.

The step rollers 5 move past on a track following the outside shape of these bent sections 17. Recesses 14 are such that the step rollers 5 can move suitably along these bent sections 17 are provided in positions facing the bent sections 17.

In order to prevent riding up by the following step roller 5 when the preceding step roller 5 passes the bent section 17, a restraining member 18 is provided in a position facing the step guide rail 3 at a position upstream of the bent section 17 that is provided in the vicinity of the outgoing path driving sprocket wheel 9, so that the top end of the step roller 5 moves rolling along the undersurface of this restraining member 18.

Such a restraining member 18 is likewise provided in a position facing a position downstream of the bent section 17 that is provided in a location in the vicinity of the driven sprocket wheel 11 on the outgoing path side of the moveable rail 3c shown in FIG. 4.

Speed irregularities of the step rollers 5 are effectively absorbed and suppressed by the provision at least of the bent section 17 of the main rail body 3a in the vicinity of the outgoing path side driving sprocket wheel 9 and the provision of the restraining member 18 at a position upstream thereof. Thus the steps 4 that are linked with the step rollers 5 can run in a smooth fashion.

It should be noted that "upstream" indicates the side of the passenger entrance 1a that is passed first when the steps 4 move in the direction of movement A and "downstream" indicates the side of the passenger exit 1b that is passed last when the steps move in the direction of movement A.

Also, vibration of the steps 4 can be suppressed by making the movement of the step rollers 5 smooth, even in the case of reverse drive of the conveyor 1, by providing bent sections 17 in locations in the vicinity of the driving sprocket wheel 9 of the restraining rail 3b provided on the return side of the step guide rail 3.

The principles of operation for the action of suppressing speed irregularities at the bent sections 17 will be described with reference to FIG. 5A, FIG. 5B, FIG. 5C and FIG. 5D and FIG. 6.

Figure 5A:
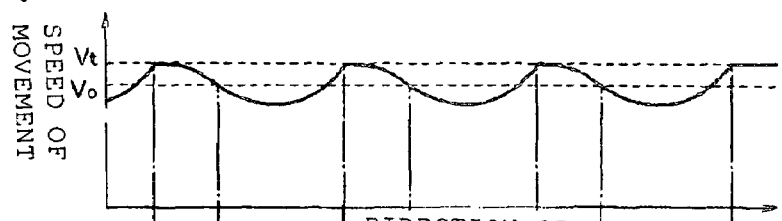
FIGS. 5A, B, C and D are views given in explanation of the speed of movement and the positional relationship of the step rollers in the conveyor shown in FIG. 4: in particular.

If the pitch circle speed of the driving sprocket wheel 9 is defined as Vt, speed irregularities as shown in FIG. 5A are generated in each step roller 5, 5a, 5b, 5c in a cycle of temporary deceleration from Vt followed by acceleration to return to Vt.

Figure 5B:
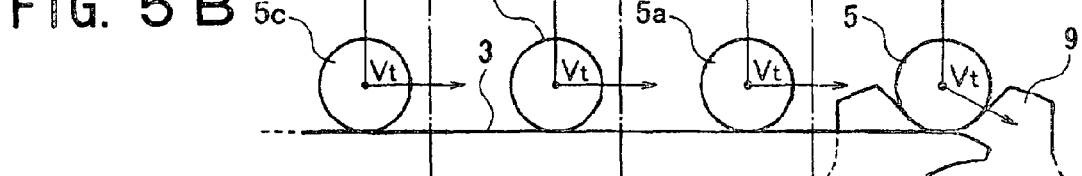
FIG. 5B is a view showing the position at which the speed of movement of the step roller becomes the pitch circle speed Vt of the driving sprocket wheel.
Figure 5C:
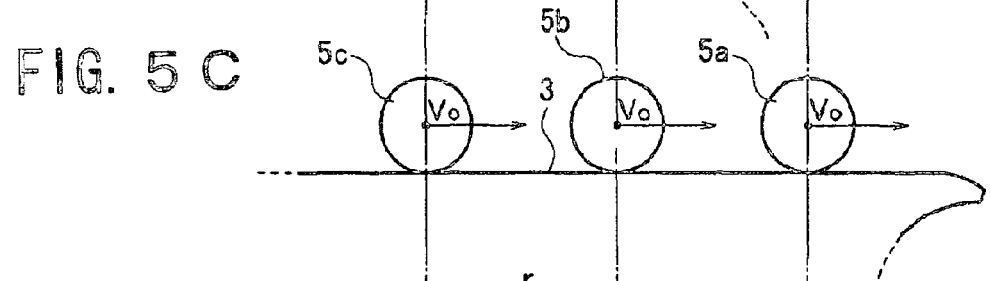
FIG. 5C is a view showing the position at which the speed of movement of the step roller becomes the average speed Vo and FIG. 5D is a view showing diagrammatically the position of formation of a hill-shaped bent section.

Specifically, if the average speed of a step roller 5 is defined as Vo, when the step rollers 5, 5a, 5b, 5c are in the positions shown in FIG. 5B on the step guide rail 3, their speed of movement is Vt. Thus, the leading step roller 5 from this position moves towards the driving sprocket wheel 9 by a prescribed distance while being progressively decelerated. The speed of the following step rollers 5a, 5b, 5c becomes the average speed Vo when these following step rollers 5a, 5b, 5c reach the positions shown in FIG. 5C.

Referring to the three mutually adjacent step rollers 5a, 5b, 5c of the step rollers 5, 5a, 5b, 5c that are linked by the step chain 7, following the step roller 5, as shown in FIG. 5B, when the leading step roller 5a passes a prescribed position (reference position) and approaches the driving sprocket wheel 9, the speed of movement of this leading step roller 5a becomes slower than the average speed.

Figure 5D:
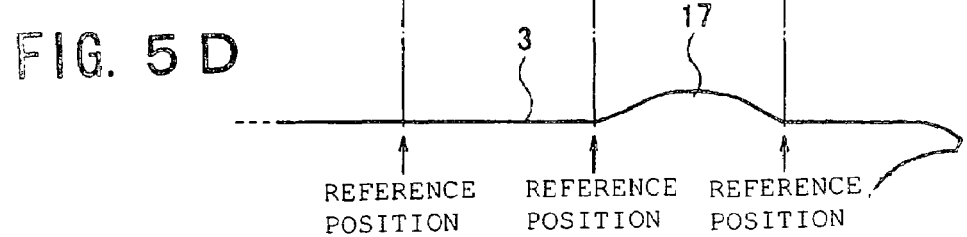

Assuming that, at this point, the second step roller 5b has reached the bent section 17 shown in FIG. 5D that is provided in the vicinity of the driving sprocket wheel 9 of the step guide rail 3, the height position of the second step roller 5b changes in accordance with the hill shape (or valley shape) of this bent section 17.

When the height position of the second step roller 5b changes, since the pitch (link length r) between the step rollers 5a, 5b, 5c is fixed, the third step roller 5c approaches the leading step roller 5a by an amount corresponding to the change in height position at the second step roller 5b, causing the third step roller 5c to be accelerated.

In this way, the amount of lowering of the speed of movement at the leading step roller 5a is cancelled by the amount of acceleration of the third step roller 5c, so the speed of movement of the third step roller 5c is maintained at the average speed Vo.

When the leading step roller 5a advances further forward, the speed of movement of this leading step roller 5a recovers, so that it becomes faster than the average speed Vo. By adopting a design such that the second step roller 5b then passes over the apex (or, as will be described, the bottom apex of the restraining member, if the bent section is valley-shaped) of the bending section 17 provided on the step guide rail 3, the height position of the second step roller 5b then returns to its original position and the third step roller 5c moves away from the leading step roller 5a i.e. the third step roller 5c is decelerated.

In this way, the deceleration of the third step roller 5c corresponding to the increase in speed of movement at the leading step roller 5a is cancelled out and the speed of subsequent movement of the third step roller 5c is maintained at the average speed Vo.

Consequently, if the position where the speed of movement of the step rollers 5a, 5b, 5c is decelerated from Vt, becoming Vo, is defined as the reference position, as shown in FIG. 5D, by providing a bent section 17 of hill-shaped (or valley-shaped) curvilinear shape at a location of the step guide rail 3 positioned between two adjacent reference positions along the step guide rail 3, speed irregularities of the step roller 5a that precedes this step roller 5b are absorbed due to the change in height position produced by movement of the step roller 5b along the curvilinear-shaped track of the bent section 17, and transmission of speed irregularities to the following step roller 5c is thus avoided, so that the step rollers 5 subsequent to the step roller 5c are maintained at the average speed Vo.

Next, a suitable specific shape in which the bent section 17 should be formed in order to absorb and suppress speed irregularities will be described with reference to FIG. 6.

As described above, in the process of meshing with the driving sprocket wheel 9, the step rollers 5 (5a, 5b, 5c) that are moving towards the driving sprocket wheel 9 over the bent section 17 are lowered in speed from the average speed Vo, causing speed irregularity. However, if the step roller 5 having this speed irregularity is referred to as the "irregular speed roller 5a", the step roller 5c that is in the second position in the upstream direction (i.e. towards the passenger entrance 1a) of the step guide rail 3 on the other side of the hill-shaped bent section 17 from this irregular speed roller 5a moves with a fixed speed (average speed Vo) without loss of speed of this step roller 5c, since the step roller 5b that is next adjacent to the irregular speed roller 5a pulls this step roller 5c as it moves along the bent section 17. Thus the step roller 5 that is in second place in the upstream direction of the step guide rail 3 on the other side of the bent section 17 from the irregular speed roller 5a and that may thus be expected to have a fixed speed will be referred to herein as the "fixed speed roller 5c".

Figure 6:
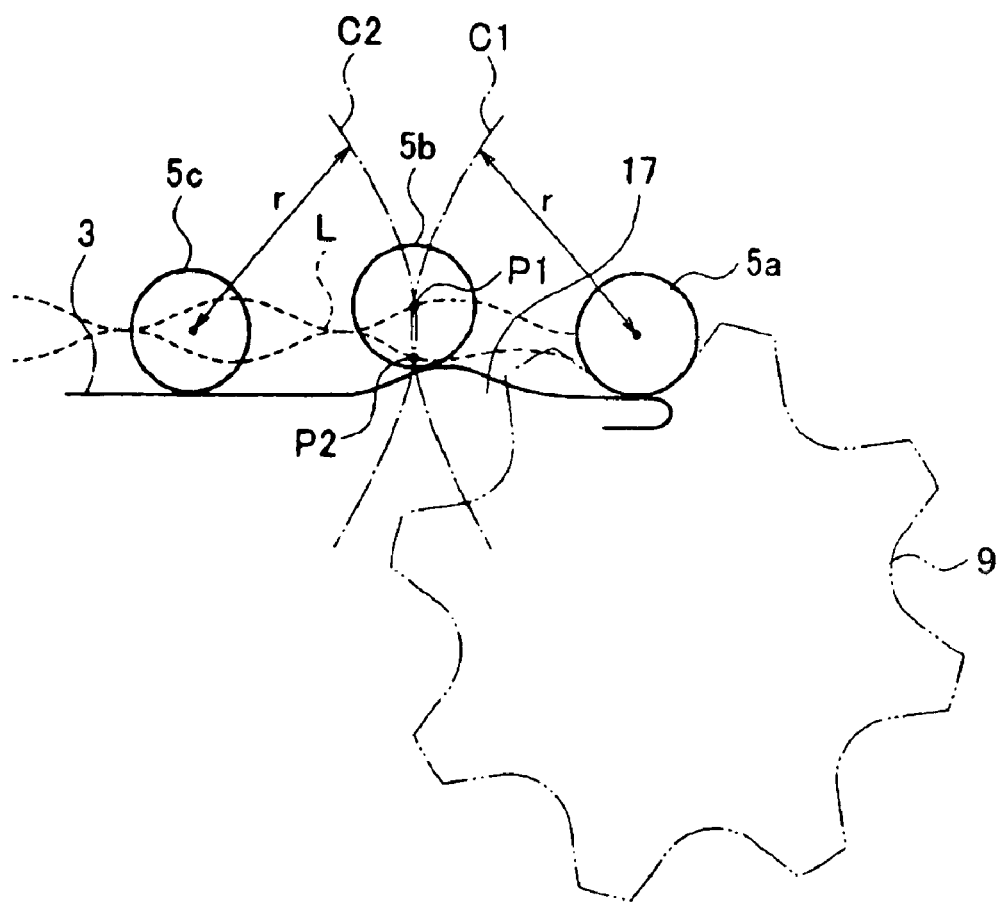
FIG. 6 is a diagram given in explanation of the shape of formation of the bent section in the conveyor shown in FIG. 4.

Accordingly, as shown in FIG. 6, when these step rollers 5a, 5b, 5c are moved by an amount corresponding to 1 pitch (link length r), if the track shown by the dotted line followed by the points of intersection P1 and P2 of the circle C1 that is described with a radius equal to the link length r of the step chain 7 from the center of the irregular speed roller 5a and the circle C2 that is described with a radius equal to the link length r of the step chain 7 from the center of the fixed speed roller 5c is defined as the roller center track L, it is desirable that the bent section 17 should be formed of a shape imitating this roller center track L.

Specifically, by setting the shape of the bent section 17 as described above, in the process of the intermediate step roller 5b passing over the bent section 17, the speed irregularity produced in the irregular speed roller 5a is theoretically completely absorbed by change of the height position of the step roller 5b in accordance with the shape of the bent section 17, so the speed of movement of the fixed speed roller 5c can be accurately maintained at a fixed speed (average speed Vo).

Since a prescribed tension is applied to the step chain 7 by a chain tensioning mechanism comprising a spring member 12, when the height position of the second step roller 5b is changed as it passes over the bent section 17, the third step roller 5c tries to ride up, but this riding up is prevented by the restraining member 18 shown in FIG. 4. As a result, the third step roller 5c is suitably accelerated or decelerated without any possibility of riding up and the speed of movement of the third step roller 5c is maintained at the average speed Vo.

It should be noted that although in FIG. 5A, FIG. 5B, FIG. 5C and FIG. 5D and FIG. 6 the heights are exaggerated in order to facilitate understanding of the shape of the bent section 17, in fact the difference in heights is extremely slight, so the structure 2 can be reduced in size and a reduction in the overall thickness of the conveyor 1 can be achieved.

Of course, if a slight speed irregularity (Vo−rω sin (ωt+φ)) is permitted in the step rollers 5, the difference in height at the bent section 17 can be further reduced.

In other words, the step roller 5c that is positioned at the second place from the upstream side (i.e. towards the passenger entrance 1a) of the step guide rail 3, on the other side of the bent section 17 from the irregular speed roller 5a that has the speed irregularity, positioned between the bent sections 17 and the driving sprocket wheel 9 as shown in FIG. 6 may now be termed a "practically fixed speed roller" 5c, in which speed irregularity may be expected to be suppressed to the slight speed irregularity (Vo−rω sin (ωt+φ)) by the movement of the intermediate step roller 5b along the bent section 17.

Thus, as described above, if the track followed by the points of intersection P1, P2 of the circle C1 and circle C2 is identified as the roller central track L, speed irregularity of the step roller 5c that follows the step roller 5b that is passing over the bent section 17 can be suppressed to be within a limited range by forming the bent section 17 in a shape imitating this roller central track L, while keeping the height difference of the bent section 17 small.

In this expression (Vo−rω sin (ωt+φ)) for the speed irregularity, ω indicates the angular velocity, t indicates the time and φ indicates the phase difference.

FIG. 7A, FIG. 7B, FIG. 7C and FIG. 7D are diagrams given in explanation of the operation of the step guide rail 3 and restraining member 18 shown in FIG. 4. The speed irregularity that is periodically generated in the step 4 indicated by a chain-dotted line in FIG. 7A is suppressed as shown by the continuous line in FIG. 7A by the presence of the hill-shaped bent section 17 and restraining member 18, so that the following step rollers 5 are maintained at the average speed Vo.

Specifically, since the step rollers 5 (5a, 5b, 5c) are subjected to biasing force of the spring member 12 constituting a chain tensioning mechanism, the pressing force that is applied to the hill-shaped bent section 17 of the step guide rail 3 is as shown in FIG. 7B. As a result, the step rollers 5 that move in rolling fashion guided by the restraining member 18 that prevents riding up apply pressure to the restraining member 18 as shown in FIG. 7C in opposition to the riding-up preventing force; in each case the pressing force thereof is a maximum in the central region.

As shown in FIG. 7A, if the pitch circle speed of the driving sprocket wheel 9 is Vt and the average speed of the step rollers 5 is Vo, the positions where the speed of the step rollers 5 is reduced from Vt to Vo are the reference positions S1, S2, S3, . . . as shown in the drawings.

A hill-shaped bent section 17 for suppressing generation of speed irregularity is provided in the step guide rail 3 positioned between the reference position S1 that is positioned in the vicinity of the driving sprocket wheel 9 and the other reference position S2 that is downstream of and adjacent to this reference position S1, as shown in FIG. 7D, of the plurality of reference positions S1, S2, S3, . . . that exist along the step guide rail 3.

Also, a restraining member 18 that abuts the step rollers 5 as they pass is provided in order to prevent riding up, at a position opposite to a position upstream of the location where the bent section 17 of the step guide rail 3 is provided.

The restraining member 18 is arranged such that its abutting face is linear so as to guide the step rollers 5 straight forwards in the horizontal direction between the reference position S2 and the reference position S3. However, as shown in FIG. 7D, a recess 3aa is formed which is a little longer than the link length r of the step rollers 5 in the step guide rail 3 in a position facing the restraining member 18.

It will be assumed in the following description of the step rollers 5 (5a, 5b, 5c, . . . ) according to this first embodiment that the step rollers 5 are provided with a resilient member having flexibility made of for example rubber around their rotating shafts, in order to suppress generation of noise during rotary movement.

Since the step rollers 5 (5a, 5b, 5c, . . . ), which have resilient members around their shafts, are pulled in the horizontal direction (direction opposite to the arrow A of FIG. 4) by the spring member 12 of the chain tensioning mechanism, when the step rollers 5 pass beyond the hill-shaped bent section 17 of the step guide rail 3 and, furthermore, when the step rollers 5 are pressed by the restraining member 18, they are subjected to pressing force in the radial direction towards their rotary shafts with a characteristic as shown in FIG. 7B and FIG. 7C, respectively, and rolling movement of the step rollers therefore takes place with the resilient members of these step rollers 5 being subjected to compressive deformation corresponding to this pressing force. As a result, the track along which the step rollers 5 move whilst guided by the bent section 17 and restraining member 18 is caused to deviate from the track that was defined beforehand with a view to suppressing speed irregularities, the amount of the deviation corresponding to the compression of diameter produced by the compression of the resilient members.

Furthermore, as mentioned above, regarding the pressing force onto the resilient members, loading is applied thereto as shown in FIG. 7D and FIG. 7C not only while the step rollers 5 ($5a$, $5b$, $5c$, . . . ) are moving past the hill-shaped bent section 17 but also while the step rollers are moving along the restraining member 18 and, in addition, while the step rollers are moving towards the driving sprocket wheel 9 from the step guide rail 3.

Accordingly, in this first embodiment, the shapes of the step guide rail 3 and restraining member 18 are formed elevated beforehand by an amount corresponding to a thickness matching the compression of the diameter dimension of the step rollers 5 by this loading, as shown by the shading in FIG. 7D, corresponding to the compression of the resilient members by the load of the pressing force when the step rollers move over the step guide rail 3 and restraining member 18.

Consequently, in this first embodiment, although the track followed by the step rollers 5 changes by the amount of the compression when the resilient members of the step rollers 5 are compressed as they move over the step guide rail 3 and/or restraining member 18, the shape of the step guide rail 3 and/or restraining member 18 is formed beforehand in an elevated manner so as to compensate for the amount of this change beforehand. It is therefore possible for the step rollers 5 to move along a track on which speed irregularity can be correctly absorbed and suppressed. Thus speed irregularity of the step rollers 5 and the steps 4 that are linked with these is avoided and movement with fixed speed in stable fashion with vibration suppressed can be achieved.

Also, in this first embodiment, as shown in FIG. 7D, a recess $3aa$ is provided in the step guide rail 3 facing the restraining member 18 and upstream (i.e. between the reference position S2 and the reference position S3) of the location where the hill-shaped bent section 17 is formed.

Consequently, when the step rollers 5 roll over the undersurface of the restraining member 18 in abutment therewith, since it is arranged, by the formation of the recess $3aa$, that the step rollers 5 do not contact the step guide rail 3 therebeneath, there is possibility of the step rollers 5 being gripped from above and below from both the restraining member 18 and the step guide rail 3; the step rollers can not therefore move while rotating smoothly. In this way, not only damage to the step rollers 5 themselves but also damage to the restraining member 18 and step guide rail 3 can be avoided.

As shown by the detail view to a larger scale in FIG. 8A, the length of the recess $3aa$ formed in the step guide rail 3 in the direction of movement A of the steps 4 is set to be somewhat longer than the pitch (link length r) of the moving step rollers 5 so that the moving step rollers 5 can move smoothly as they roll along the undersurface shape of the restraining member 18, without causing sliding friction due to their being gripped from below.

Figure 8A:
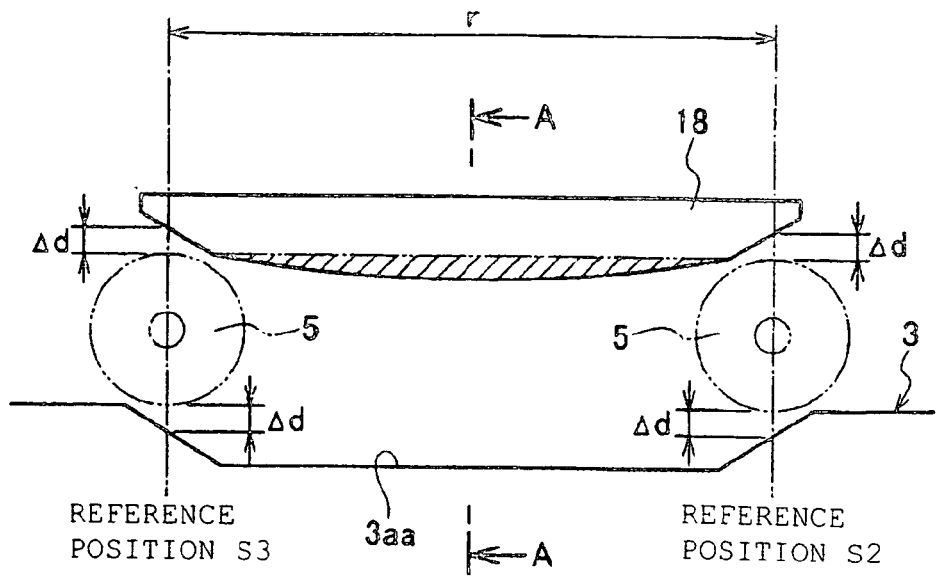
FIG. 8A is a view of a detail of FIG. 7 to a larger scale and FIG. 8B is a cross-sectional view along the line

Also, as shown to a larger scale in FIG. 8A, in this first embodiment, the entrances/exits on the left and right of the step guide rail 3 and the facing restraining member 18 are constructed in tapered fashion so as to enable movement with smooth transfer from the step guide rail 3 to the restraining member 18 or from the restraining member 18 to the step guide rail 3 without vertical movement of the step rollers 5 as they move whilst subject to the biasing force of the spring member 12.

Specifically, as shown in FIG. 8A, a tapered shape is formed inclined towards the outside at the left and right ends of the restraining member 18. Furthermore, the facing step guide rail 3 is likewise formed with a tapered shape inclined towards the inside at the left and right ends (i.e. the reference positions S2, S3) such as to link with the recess $3aa$.

Thus, as shown, practically uniform gaps Δd are formed between the passing step rollers 5 and the restraining member 18 and step guide rail 3, positioned practically in the center of the tapers at the locations of the reference positions S2, S3 at each end.

Figure 8B:
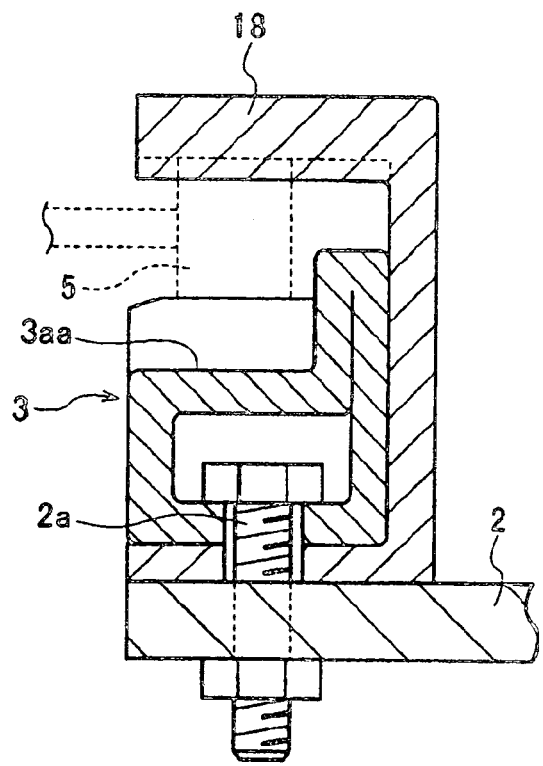

FIG. 8B is a cross-sectional view along the direction of the arrow A-A of FIG. 8A. As shown in FIG. 8B, the restraining member 18 of this embodiment is mounted on the structure 2 such as a truss integrally with the step guide rail 3 by means of bolts $2a$. Of course, it would be possible to fix the restraining member 18 in separate fashion from the step guide rail 3 by mounting it separately onto for example the structure 2.

Figure 9:
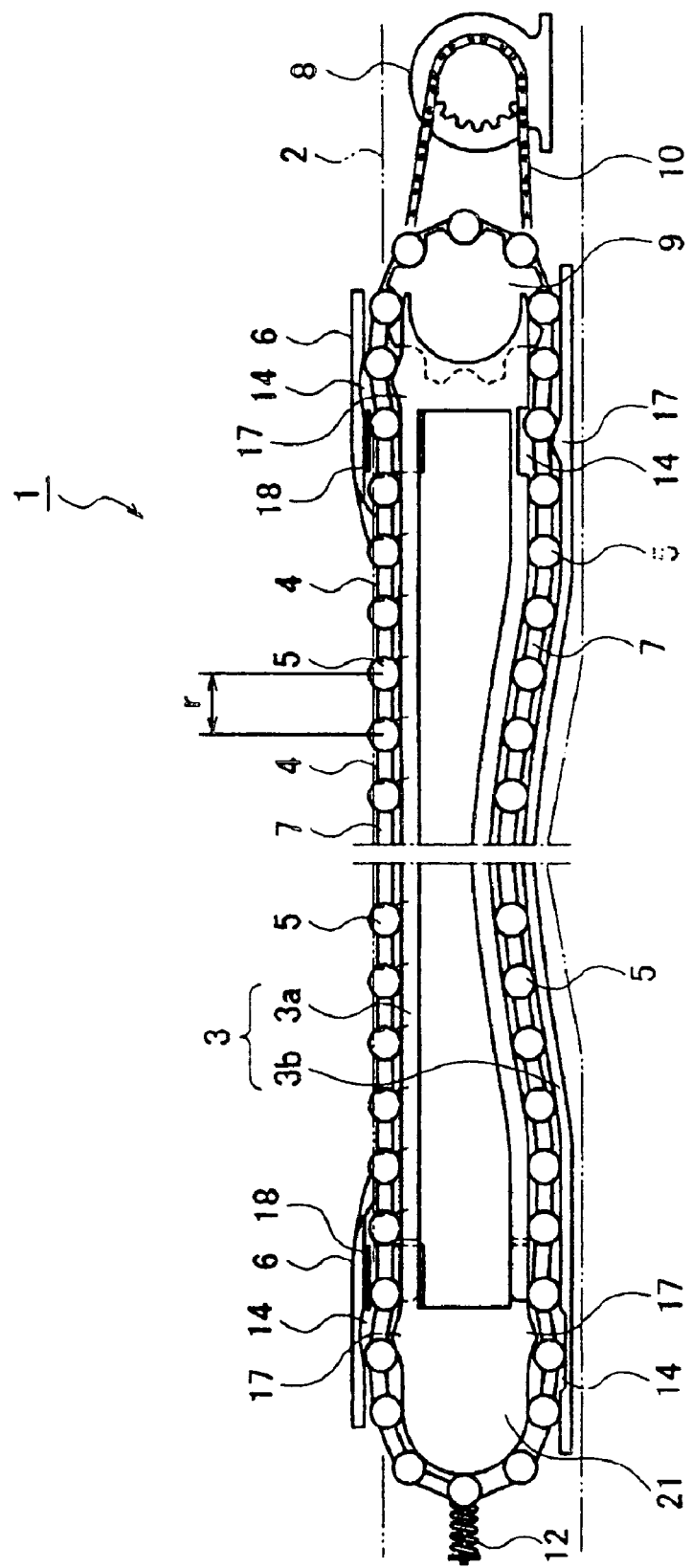
FIG. 9 is a layout diagram showing an example in which a moveable rail 21 is adopted in the first embodiment shown in FIG. 4.

It should be noted that, although, as shown in FIG. 4, in this first embodiment, the case was described in which the step chain 7 was extended between the driving sprocket wheel 9 and the driven sprocket wheel 11, as shown in FIG. 9, if a moveable rail 21 is employed that is formed in practically U shape, it would also be possible for the step chain 7 to be extended between the driving sprocket wheel 9 and the moveable rail 21 instead of the driven sprocket wheel 11.

It should be noted that the portion of the moveable rail 21 over which the step chain 7 is extended is constituted as a circular portion of practically the same diameter as the driving sprocket wheel 9 and is guided so as to abut at its periphery the step rollers 5 that are linked by the step chain 7.

Like the driven sprocket wheel 11, this moveable rail 21 is given an optimum tension with respect to the step chain 7 by being biased in the direction away from the driving sprocket wheel 9 by means of a spring member 12 of a chain tensioning mechanism.

It should be noted that, if speed irregularity is generated in the step rollers 5, the moveable rail 21 may vibrate in the direction towards/away from the driving sprocket wheel 9 under their influence, but, by providing bent sections 17 as described above on the outgoing path side and return side of this moveable rail 21, such speed irregularities of the step roller 5 can be effectively suppressed in the moveable rail 21, and vibration generated in the steps 4 and hence also in the moveable rail 21 can likewise be effectively suppressed. Thus a conveyor 1 providing excellent passenger comfort can be provided.

Conveniently also bent sections 17 are formed on both the outgoing path side and return side of the moveable rail 21, thereby making it possible to cope with reverse drive of the conveyor 1.

In either case, with the first embodiment constructed as described above, in the case where resilient members are interposed around the axes of the step rollers 5 in order to suppress generation of noise by the step rollers 5 during running, compensation for the compressive deformation of the resilient members by elevation beforehand of the hill-shaped bent sections 17 and restraining members 18 etc by a height matching the compression in the radial direction of the step rollers 5, in order to avoid the speed irregularity absorption and suppression effect being impaired by the compressive deformation of the resilient members makes it possible to provide a conveyor offering excellent passenger comfort, in which speed irregularity can be appropriately reduced or avoided.

It should be noted that, although in the first embodiment described above the description was given assuming that compression of diameter of the step rollers 5 would take place during running due to the interposition of the resilient members around the shafts, and that the restraining member 18 and/or step guide rail 3 facing these would be formed beforehand in elevated fashion by an amount matching the amount of such compression, if the step rollers 5 themselves are formed of hard material so that no especial compressive deformation may be anticipated, there is no need to form such elevated portions and the step rollers 5 can roll smoothly thanks to the presence of the recesses 3aa formed in the step guide rail 3, thereby making it possible to provide a conveyor of excellent passenger comfort in which speed irregularity is suppressed.

Although in the first embodiment described above, the case was described in which a hill-shaped bent section 17 was provided in the step guide rail 3, as mentioned above, generation of speed irregularity can likewise be suppressed by providing a valley-shaped bent section 17 in the step guide rail 3.

Second Embodiment

A conveyor according to a second embodiment of the present invention in which a valley-shaped bent section is provided in the step guide rail 3 is described with reference to FIG. 10A, FIG. 10B, FIG. 10C and FIG. 10D and FIG. 11. The second embodiment differs from the first embodiment in that, in contrast with the first embodiment, in the conveyor 1 according to the second embodiment, a valley-shaped bent section is provided in the step guide rail 3 instead of the hill-shaped bent section 17 and restraining member 18 and a restraining member is provided corresponding to this valley-shaped bent section. Other details are common with the first embodiment, so the description will concentrate in particular on the construction and action in regard to this difference.

In this second embodiment also, a case will be described below assuming that resilient members are interposed around the shafts of the step rollers 5.

Figure 11:
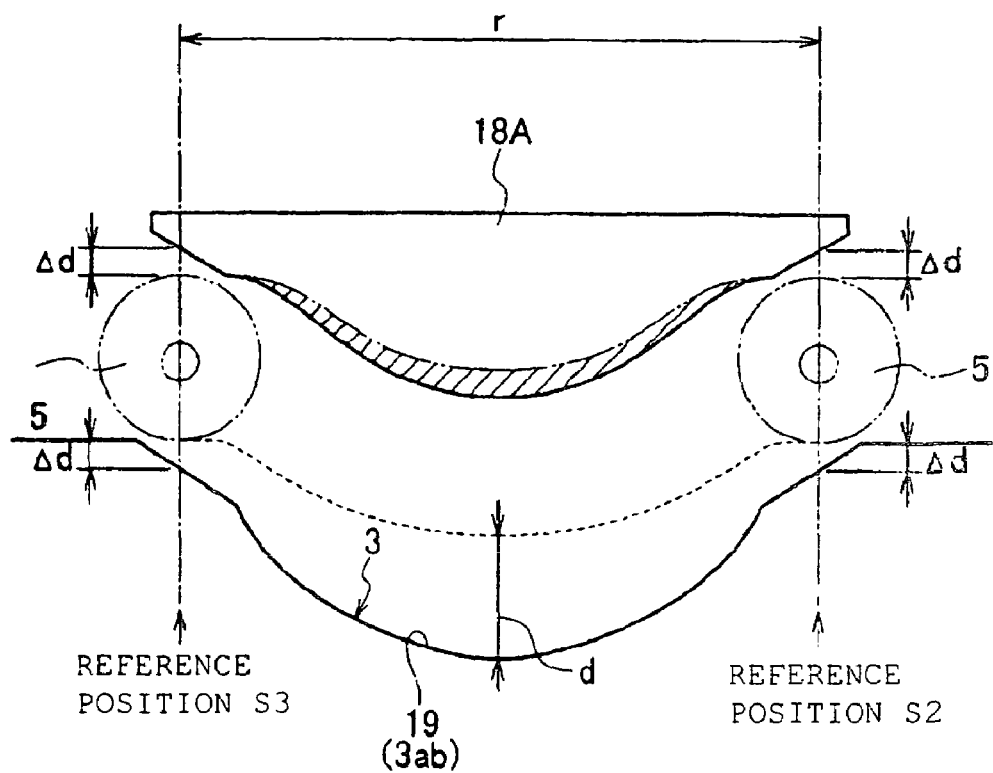
FIG. 11 is a view of a detail of FIG. 10 to a larger scale.
Figure 12A:
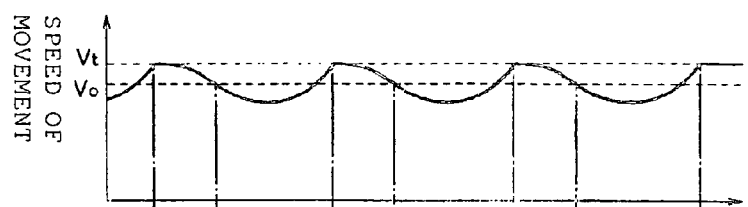
FIGS. 12A, B, C and D show a third embodiment of a conveyor according to the present invention: in particular.
Figure 12B:
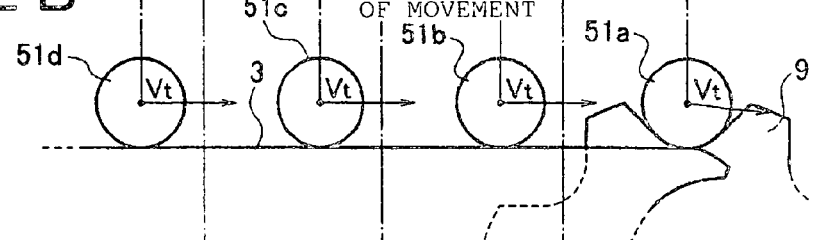
FIG. 12B is a view showing the position at which the speed of movement of the step roller becomes the pitch circle speed Vt of the driving sprocket wheel.
Figure 12C:
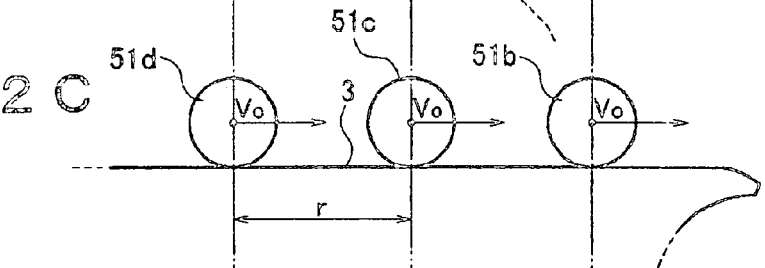
FIG. 12C is a view showing the position at which the speed of movement of the step roller becomes the average speed Vo and FIG. 12D is a diagram showing the shape of formation of a hill-shaped bent section.
Figure 12D:
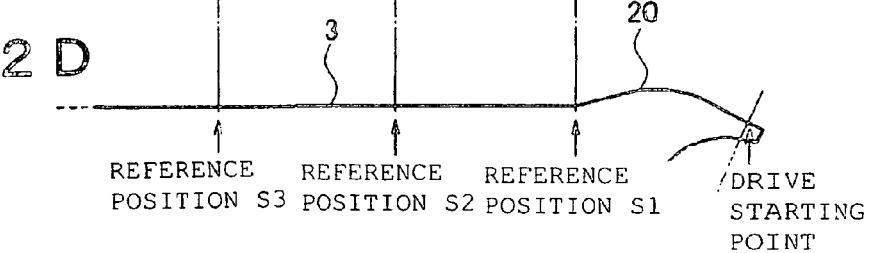

FIG. 10A, FIG. 10B, FIG. 10C and FIG. 10D are diagrams corresponding to FIG. 11 describing the first embodiment. In the second embodiment, unlike the first embodiment, a valley-shaped bent section 19 is formed in the step guide rail 3 in order to suppress generation of speed irregularity.

If the pitch circle speed of the driving sprocket wheel 9 is defined as Vt and the average speed of the step rollers 5 that are moved linked with the step chain 7 is defined as Vo, and the positions where the speed of the step rollers 5 is reduced from Vt to Vo are defined as the reference positions, as shown in FIG. 10D, of the plurality of reference positions S1, S2, S3, . . . that exist along the step guide rail 3, a valley-shaped bent section 19 is provided at a location of the step guide rail 3 that is positioned between the second reference position S2 that is adjacent to the reference position positioned in the vicinity of the driving sprocket wheel 9 and the third reference position S3 that is adjacent to this reference position.

A restraining member 18A that abuts the step rollers 5 is provided at a position facing the location of the step guide rail 3 where the valley-shaped bent section 19 is provided. The step rollers 5 are made to roll along the shape of the undersurface of this restraining member 18A, so generation of speed irregularities in the steps 4 can be avoided.

Specifically, the undersurface of the restraining member 18A that is abutted by the step rollers 5 follows the roller center track L of FIG. 6 that was described in the first embodiment. The speed of the following step roller 5 when the step rollers roll along the shape of the undersurface of the restraining member 18A is therefore maintained at the fixed average speed Vo.

In this second embodiment also, since tension in the running direction is applied to the step rollers 5 by the chain drive mechanism constituted by the spring member 12 and pressing force acts between the step rollers 5 and the step guide rail 3 when the step rollers 5 move towards the driving sprocket wheel 9 from the step guide rail 3, as respectively shown in FIG. 10B and FIG. 10C, pressing force in respect of the step guide rail 3 and restraining member 18A acts on the step rollers 5 whilst they are in running motion.

Accordingly, in this second embodiment, compensation is performed by elevating the shapes of the step guide rail 3 and restraining member 18A as shown by the shading in FIG. 10D, by an amount matching the amount of compression of the radial dimension of the step rollers 5 by the compressive deformation of the resilient members of the step rollers 5 in the radial direction by the pressing force applied thereto as shown in FIG. 10B and FIG. 10C.

Consequently, even though the resilient members of the step rollers 5 are compressed as the step rollers 5 run, guided by the step guide rail 3 and restraining member 18A, thanks to the elevation compensation, the step rollers 5 run correctly along a track whereby speed irregularity of the step rollers 5 can be appropriately suppressed and absorbed, so the speed of movement of the following step roller 5 after the valley-shaped bent section 19 is maintained at the average speed Vo as shown by the continuous line in FIG. 10A.

Also, in this second embodiment, as shown to a larger scale in FIG. 11, the valley-shaped bent section 19 of the step guide rail 3 positioned in a position corresponding to the restraining member 18A is formed a little longer than the pitch (link length r) of the step rollers 5 of the step guide rail 3, and a region corresponding to the zone of abutment of the step rollers 5 with the restraining member 18A is provided with a recess 3ab of a depth d constituted by a further increase in the depth of the valley shape in the downwards direction.

Consequently, in this second embodiment, thanks to the formation of the recess 3ab of depth d in the valley-shaped bent section 19, the step rollers 5 that move while rotating along the undersurface of the restraining member 18A are prevented from being subjected to contact pressing force onto the step guide rail 3 and are thus never gripped from below by the step guide rail 3. The step rollers 5 can therefore roll smoothly along the shape defined with a view to suppression of speed irregularities formed in the restraining member 18A.

Thus the step rollers 5 moving along the undersurface of the restraining member 18A are never subjected to pressure from the step guide rail 3, so damage caused by sliding friction not only of the step rollers 5 but also of the restraining member 18A and step guide rail 3 can be avoided.

Also, as shown in FIG. 11, the restraining member 18 is formed with a tapered shape inclined towards the outside at the entrances/exits at the left and right ends of the restraining member 18A and of the valley-shaped bent section 19 opposite thereto. Furthermore, the facing step guide rail 3 is likewise formed with a tapered shape inclined towards the inside such as to link with the recess 3ab.

In addition, the restraining member 18A and step guide rail 3 are arranged to have practically equal gaps (Δd) in each case with respect to the passing step rollers 5 at the locations of the reference positions S2, S3 on the left and right.

Consequently, although the step chain 7 and step rollers 5 try to extend with high linearity in the horizontal direction due to the action of the tensile force on the step chain 7 provided by the tensile force of the spring member 12, thanks to the play provided by the aforementioned gaps (Δd) in the vertical direction, guidance of the step rollers 5 is smoothly transferred from the step guide rail 3 to the restraining member 18 or from the restraining member 18 to the step guide rail 3.

In this second embodiment also, in cases where no resilient member having flexibility such as rubber is provided around the shafts of the step rollers 5, speed irregularities can be suitably suppressed and absorbed without providing elevation compensation at the restraining member 18A and step guide rail 3, and the step rollers 5 etc can perform satisfactory rolling movement, thanks to the presence of the recess 3*ab*.

The restraining member 18A, like the restraining member 18 in the first embodiment can be of a construction integrally mounted on the step guide rail 3 or the structure 2.

Next, although, in the first embodiment described above, a hill-shaped bent section 17 was provided on the step guide rail 3 between the reference position S1 and the reference position S, it is possible to secure excellent passenger comfort and to achieve a reduction in the thickness of the device as a whole while suppressing speed irregularity of the step rollers 5 by providing a hill-shaped bent section 17 on the step guide rail 3 between the reference position S1 and the driving sprocket wheel 9.

Third Embodiment

A third embodiment of a conveyor according to the present invention in which a hill-shaped bent section 17 is provided on a step guide rail 3 between a driving sprocket wheel 9 and a reference position S1, which is the reference position that is in the vicinity of the driving sprocket wheel 9, is described with reference to FIG. 12 to FIG. 15. Only the differences from the construction of the first embodiment will be particularly described.

FIG. 12 is a diagram corresponding to FIG. 5 of the first embodiment. As shown in FIG. 12, if a point on the driving sprocket wheel 9 separated by the amount of the pitch (link length r) of the step chain 7 from the reference position S1 which, of the plurality of reference positions S1, S2, S3, . . . present along the step guide rail 3, is in the vicinity of the driving sprocket gear 9, is defined as the drive starting point, speed irregularity in the steps 4 can be suppressed or absorbed by providing a hill-shaped bent section 20 projecting towards the steps 4 on the step guide rail 3 between this drive starting point and the reference position S1.

The drive starting point is the starting point whereby the step rollers 5 are subjected to a feeding action with circular speed Vt by the driving sprocket wheel 9 as the step rollers 5 move towards the driving sprocket wheel 9 from the step guide rail 3. As stated above, this drive starting point is located on the driving sprocket wheel 9 separated by the amount of the pitch (link length r) of the step chain 7 from the reference position S1 that is in the vicinity of the driving sprocket wheel 9.

Figure 13:
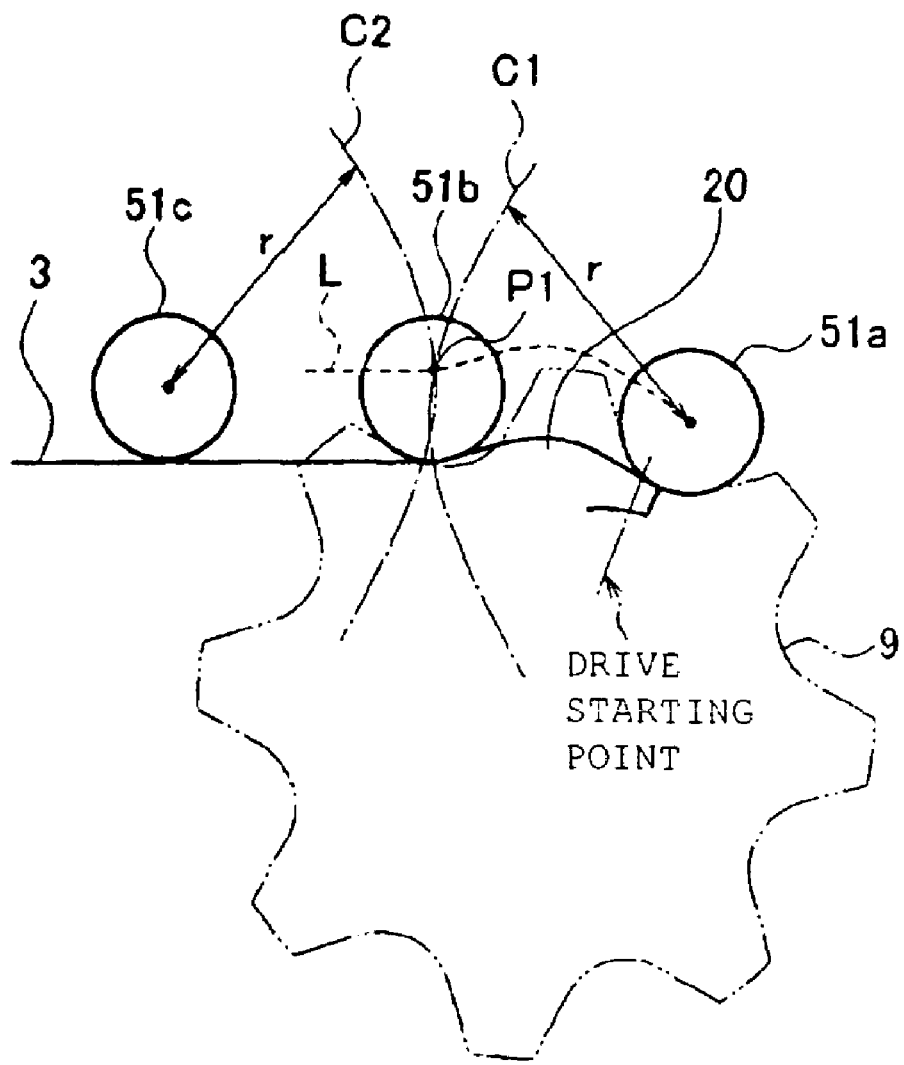
FIG. 13 is a diagram showing the shape of formation of a bent section in the conveyor shown in FIG. 12.

In addition to FIG. 4, the basic action of the conveyor according to this third embodiment is described with reference to FIG. 12 and FIG. 13.

Referring to the three mutually adjacent step rollers, of the step rollers 5 that are linked by the step chain 7, as shown in FIG. 12, when the leading step roller 51*a* passes over the prescribed position (reference position) as it approaches the driving sprocket wheel 9, the speed of movement of this leading step roller 51*a* becomes slower than the average speed. Concurrently, when the second step roller 51*b* arrives at the hill-shaped bent section 20 between this drive starting point and the reference position S1 that is in the vicinity of the driving sprocket wheel 9, the height position of the second step roller 51*b* changes as it passes over the hill shape of this bent section 20.

Since the pitch (link length r) between the step rollers 5 is fixed, when the height position of the second step roller 51*b* changes, the third step roller 51*c* moves closer to the leading step roller 51*a* by an amount corresponding to the change of height position of the second step roller 51*b*, and the third step roller 51*c* is therefore accelerated. As a result, the amount of lowering of the speed of movement of the leading step roller 51*a* is cancelled by the amount of acceleration of the third step roller 51*c*, so the speed of movement of the third step roller 51*c* is maintained at the average speed Vo.

When the leading step roller 51*a* advances further forward, the speed of movement of this leading step roller 51*a* recovers, so that it becomes faster than the average speed. The second step roller 51*b* then passes over the hill-shaped bent section 20 that is provided on the step guide rail 3, so the height position of the second step roller 51*b* then returns to its original position and the third step roller 51*c* moves away from the leading step roller 51*a* i.e. the third step roller 51*c* is decelerated. As a result, the amount of increase of the speed of movement of the leading step roller 51*a* is cancelled by the amount of deceleration of the third step roller 51*c*, so the speed of movement of the third step roller 51*c* is maintained at the average speed Vo.

As described above, with the conveyor 1 according to the third embodiment, since a construction is adopted such that speed irregularities generated in the leading step roller 51*a* are absorbed by the provision of a hill-shaped bent section 20 in the step guide rail 3, positioned between the drive starting point on the driving sprocket wheel 9 and the reference position S1 that is in the vicinity of the driving sprocket wheel 9, these speed irregularities are not transmitted to the following step rollers 51*c*, 51*d* . . . Thus the speed of movement of the steps 4 used by the passengers is maintained practically at the average speed Vo, making it possible to secure excellent passenger comfort.

Also, in this case too, since the height of the hill-shaped bent section 20 provided on the step guide rail 3 does not in fact need to be made particularly great, this is advantageous in achieving a reduction of the overall thickness of the conveyor.

The optimum shape of the hill-shaped bent section 20 in this second embodiment will now be described with reference to FIG. 13.

The speed of movement of the step roller 51*a* moving towards the driving sprocket wheel 9 after passing the bent section 20 becomes equal to the pitch circle speed Vt of the driving sprocket wheel 9 as it meshes with the driving sprocket wheel 9 at the drive starting point on the driving sprocket wheel 9.

The step roller 5 whose speed of movement has become Vt at the drive starting point will now for convenience be referred to as "sprocket roller 51*a*".

Also, thanks to the movement of the step roller 51*b*, that is adjacent to the sprocket wheel roller 51*a*, along the bent section 20, the second step roller 51*c* on the upstream side (side nearest the passenger entrance 1*a* of the conveyor 1) of the step guide rail 3 on the other side of the bent section 20 from this sprocket roller 51*a* moves with a fixed speed (average speed Vo).

The step roller 51*c* that is the second on the upstream side of the step guide rail 3, on the other side of the bent section 20 from the sprocket roller 51*a*, and that may be anticipated to have a fixed speed, will now for convenience be referred to as the "fixed speed roller".

If the track that is followed, when the step rollers 51*a*, 51*b*, 51*c* move by an amount corresponding to one pitch (link length r), by the point of intersection P1 of the circle C1 drawn with a radius equal to the link length r of the step chain 7 from the center of the sprocket roller 51*a* and the circle C2 drawn with radius of link length r of the step chain 7 from the center of the fixed speed roller 51*c* is defined as the roller center track L, the bent section 20 may be formed in a shape imitating that of this roller center track L.

By setting the shape of the bent section 20 shape imitating that of the above roller center track L, speed irregularities produced in the sprocket roller 51*a* during the passage of the step roller 51*b* over the bent section 20 are theoretically completely absorbed by the change in the height position of the step roller 51*b* in accordance with the shape of the hill-shaped bent section 20, so the speed of movement of the fixed speed roller 51*c* can be accurately maintained at a fixed speed (average speed Vo).

In this case, according to a trial calculation by the present inventors, if it is assumed that the number of teeth of the driving sprocket wheel 9 is 16 and that the link length of the step chain 7 is 135 mm, if the bent section 20 is formed in a shape imitating the roller center track L referred to above, the difference of height of the bent section 20 from the upper surface of the step guide rail 3 is only 1.53 mm.

As described above, in a conveyor 1 according to the third embodiment, if a hill-shaped bent section 20 of a shape imitating the center track L described above is formed in a location of the step guide rail 3 positioned between the drive starting point on the driving sprocket wheel 9 and the reference position that is the closest to the driving sprocket wheel 9, the speed of movement of the step roller 5*c* and subsequent rollers following the step roller 5*b* that is passing over the bent section 20 becomes constant due to the passage of the step rollers 5 linked with the step chain 7 over this hill-shaped bent section 20; as a result, vibration of the steps 4 can be effectively suppressed and excellent passenger comfort secured.

In this third embodiment also, just as in the case of the first embodiment, if a slight speed irregularity (Vo−rω sin (ωt+φ)) is permitted in the step rollers 5, the difference in height at the hill-shaped bent section 20 can be further reduced.

Specifically, if: the step roller 5 whose speed of movement becomes Vt by meshing with the driving sprocket wheel 9 at the drive starting point is identified as the sprocket roller 51*a* as above; and the step roller 5 that is anticipated to be suppressed to the slight degree of speed irregularity (Vo−rωsin (ωt+φ)) by the movement of the step roller 51*b* adjacent to the sprocket roller 51*a* along the bent section 20 i.e. the second step roller 5*c* upstream (i.e. on the side of the passenger entrance 1*a* of the conveyor 1) of the step guide rail 9 and on the other side of the bent section 20 from this sprocket roller 51*a* is identified as the practically fixed speed roller 51*c*, when these step rollers 51*a*, 51*b*, 51*c* move by the amount of one pitch (link length r), if the track followed by the point of intersection P1 of the circle C1 drawn with a radius of the link length r of the step chain 7 from the center of the sprocket roller 51*a* and the circle C2 drawn with a radius of the link length r of the step chain 7 from the center of the practically fixed speed roller 51*c* is identified as the roller center track L, by forming the bent section 20 with a shape imitating this roller center track L, the speed irregularities of the step rollers 5 following the step roller 5 that is passing over the bent section 20 can be suppressed to within an allowed range while further reducing the height difference of the bent section 20; in this way reduced thickness of the conveyor 1 as a whole can be achieved.

Next, the specific structure and operation of a conveyor 1 according to the third embodiment will be described with reference to FIG. 14A and FIG. 14B.

Attention will now be focused on the three mutually adjacent step rollers 51*a*, 51*b* and 51*c* linked by the step chain 7.

As described above, when the leading step roller 51*a* reaches the drive starting point on the driving sprocket wheel 9, thus acquiring the pitch circle speed Vt, the second step roller 51*b*, on arrival at the hill-shaped bent section 20, moves in decelerated fashion whilst its height position changes. As a result of this change in the height position of the second step roller 51*b*, the third step roller 51*c* approaches the leading step roller 51*a* by an amount corresponding to the change of the height position of the second step roller 51*b* i.e. the third step roller 51*c* is accelerated.

The lowering of the speed of movement of the step roller 51*b* is thus cancelled out by the acceleration of the step roller 51*c*, with the result that the speed of movement of the step roller 51*c* is maintained at the average speed Vo. However, considering the situation if no hill-shaped bent section 20 were provided, on further advance of the leading step roller 51*a*, the speed of movement of the second step roller 51*b* would recover and would become faster than the average speed Vo.

However, in this third embodiment, thanks to the hill-shaped bent section 20 between the drive starting point and the reference position S1, the second step roller 51*b* passes over the hill-shaped bent section 20, so the height position of the second step roller 51*b* returns to its original value, causing the third step roller 51*c* to move away from the leading step roller 51*a*, with the result that the third step roller 51*c* is decelerated. In this way, the increase in the speed of movement of the second step roller 51*b* is cancelled out by the amount of deceleration of the third step roller 51*c* and the speed of movement of the third step roller 51*c* is thus maintained at the average speed Vo.

Figure 14A:
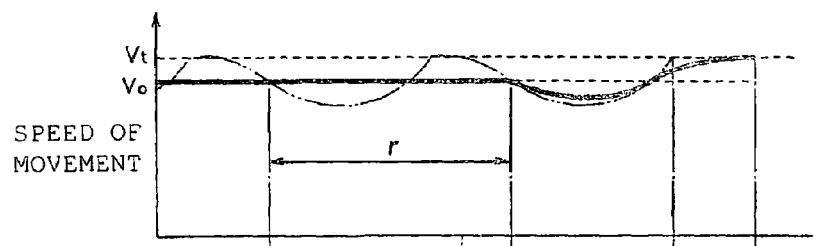
FIGS. 14A and B are views given in explanation of the speed of movement of the step roller when a resilient member is interposed around the shaft of the step rollers in the conveyor shown in FIG. 12 and the pressing force acting between the step roller and the step guide rail and the restraining member: in particular.
Figure 14B:
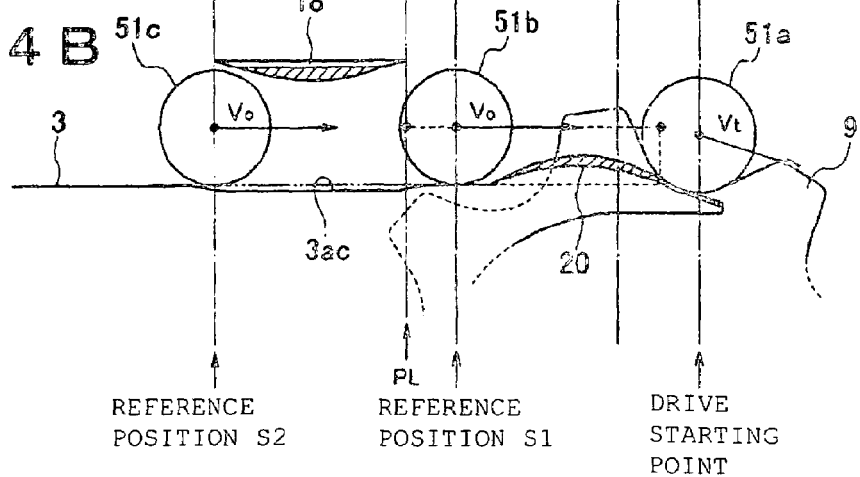
FIG. 14B is a view showing diagrammatically how the shape of the bent section and the shape of the restraining member correspond with the step rollers that are provided with resilient members.

Also, concurrently, prescribed tension is applied to the step chain 7 by the chain tensioning mechanism comprising the spring member 12 described above but the third step roller 51*c* is prevented from riding up by the restraining member 18 shown in FIG. 14B. Consequently, even while the height position of the second step roller 51*b* is being changed along the bent section 20, the third step roller 51*c* is appropriately accelerated/decelerated, with the result that the speed of movement of the third step roller 51*c* is reliably maintained at the average speed Vo.

Next, in this third embodiment, shape correction of the step guide rail 3 and restraining member 18 in the case where suppression of noise etc is sought by employing step rollers 5 provided with resilient members around their rotary shafts will be described.

Specifically, when the step rollers 5 come into contact with the step guide rail 3 and the restraining member 18, the resilient members are compressed in the process of the step rollers 5 meshing with the teeth of the driving sprocket wheel 9 and by the pressing force of the step rollers 5 with respect to the step guide rail 3 and the restraining member 18 in the action of restraining speed irregularity of the steps 4 at the hill-shaped bent section 20.

In order to compensate for the departure from the prescribed track of the step rollers 5 produced by the compression of these resilient members, the shape of the faces of the step guide rail 3 and restraining member 18 abutting the step rollers 5 is compensated beforehand by elevation as shown by the shading in FIG. 14 B, as in the first embodiment.

Specifically, as shown in FIG. 14A, if the pitch circle speed of the driving sprocket wheel 9 is defined as Vt and the average speed of the step rollers 5 that are moved linked with the step chain 7 is defined as Vo and the reference positions are defined as the positions where the speed of the step rollers 5 decreases from Vt to Vo, a restraining member 18 that abuts the step rollers 5 is provided at a position facing the upstream end of the hill-shaped bent section 20 provided on the step guide rail 3 located between the reference position S1 that is in the vicinity of the driving sprocket wheel 9 and the drive starting point on the driving sprocket wheel 9 that is separated by an amount corresponding to the pitch (link length r) of the step chain 7 from this reference position S1.

In order to maintain the speed of movement of the third step roller 51c reliably at the average speed Vo, the linear restraining member 18 is arranged facing the step guide rail 3 in such a manner that the third step roller 51c is handed over between a position PL and the reference position S2, where this position PL is the position on the side of the passenger exit 1b of the step guide rail 3 that is necessary for preventing riding up of at least the third step roller 51c.

Just as in the first embodiment, a recess 3ac is formed in the step guide rail 3 such as to prevent contact of the step roller 5 therewith whilst the step roller 5 is performing rotating movement whilst abutting the undersurface of the restraining member 18.

In the construction shown in FIG. 14A and FIG. 14B, when the step rollers 5 (51a, 51b, 51c, . . . ) are positioned at the reference position S1 and reference position S2, the step chain 7 is in a condition extending in a straight line in the horizontal direction so that the step rollers 5 (51a, 51b, 51c, . . . ) move whilst rotating in abutment with the undersurface of the restraining member 18; and since the recess 3ac is formed in the step guide rail 3, even though tension acts on the step chain 7 due to the chain tensioning mechanism, there is no possibility of the step rollers 5 being subjected to pressure from the side of the step guide rail 3.

If resilient members are formed around the shafts of the step rollers 5, pressing force acts as shown by the broken line in FIG. 14B between the step rollers 5 and step guide rail 3 and restraining member 18 in the same way as in the first embodiment and the diameter of the step rollers 5 is thereby reduced.

In this third embodiment also, the bent section 20 of the step guide rail 3 and the undersurface shape of the restraining member 18 are formed in elevated fashion by a height of an amount matching the reduction in diameter of the step rollers 5, so the step rollers 5 can move running along the track that was pre-set with a view to preventing speed irregularities.

In this way, in the third embodiment also, in which a hill-shaped bent section 20 is provided between the drive starting point and the reference position S1, even if resilient members are provided around the shafts of the step rollers 5, the step rollers 5 can be made to pass in a suitable manner along the prescribed track for suppressing generation of speed irregularities; also, thanks to the provision of the recess 3ac of depth d in the step guide rail 3 at a position facing the restraining member 18, the step rollers 5 can execute rolling movement smoothly without any possibility of being gripped from above and below.

Figure 15:
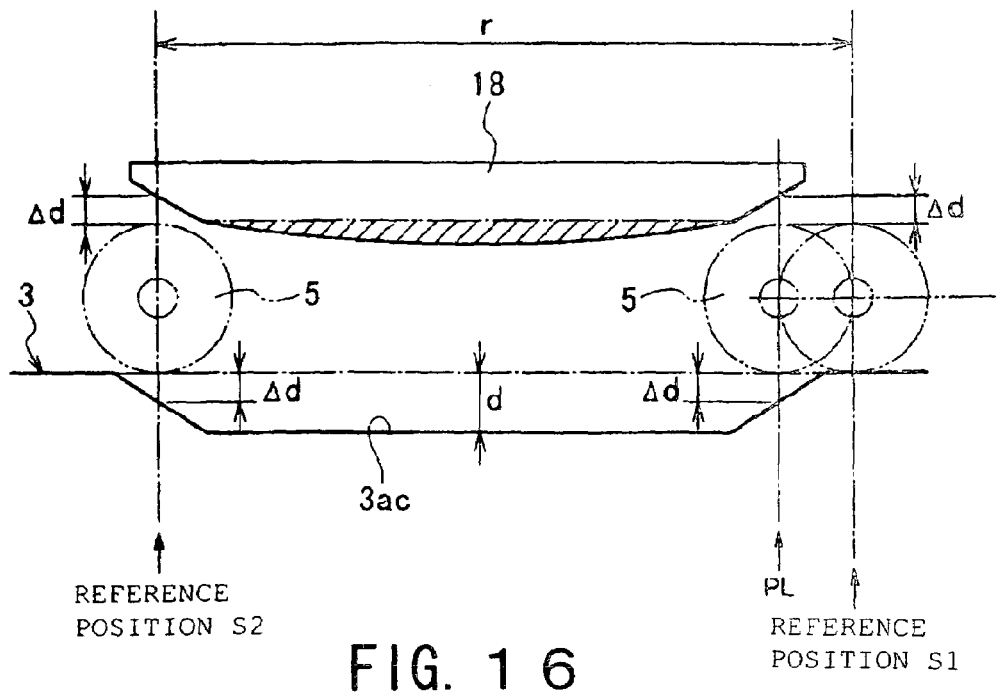
FIG. 15 is a view of a detail of FIG. 12B to a larger scale.

Also, in this third embodiment, as shown in FIG. 15, which shows a detail of FIG. 14A and FIG. 14B to a larger scale, since the restraining member 18 and the step guide rail 3 that is formed with a recess 3ac in a position facing the restraining member 18 are formed respectively in tapered fashion at the left and right entrances/exits where the step rollers 5 enter and leave, and a practically uniform separation Δd is formed vertically at the position PL and the reference position S2, the step rollers 5 can enter and leave smoothly with the step chain 7 maintaining a condition extending in a straight line in the horizontal direction.

Of course, in this third embodiment also, if no resilient member is formed around the shafts of the step rollers 5, there is no need to form elevations as indicated by the shading in FIG. 14B and FIG. 15 and the step rollers 5 can execute rolling movement smoothly along the undersurface of the restraining member 18 thanks to the presence of the recess 3ac of depth d provided in the step guide rail 3, thereby avoiding damage to the step rollers etc.

Figure 16:
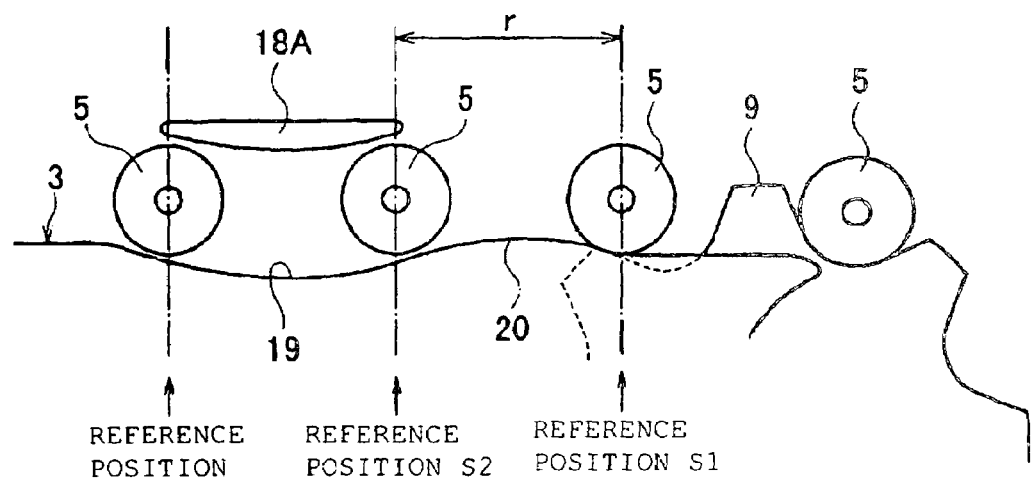
FIG. 16 is a diagram of a conveyor with a combined construction having a bent section in a step guide rail as in the conveyor of the first embodiment shown in FIG. 4 and a bent section in a step guide rail as in the conveyor of the second embodiment shown in FIG. 10.

It should be noted that, although, in the description of the above embodiments, a hill-shaped bent section or valley-shaped bent section was respectively individually adopted, a construction could be adopted, as shown in FIG. 16, in which the hill-shaped bent section 20 of the first (or third) embodiment and the valley-shaped bent section 19 of the second embodiment are connected in the running direction. With a construction in which a hill-shaped bent section 20 and valley-shaped bent section 19 are connected, although speed irregularity absorption and suppression can likewise be performed, this can be implemented with a smaller hill height and shallower valley depth; thus the pressing force i.e. the mechanical load of the step rollers 5 between the step guide rail 3 and the restraining member 18A can be to that extent reduced. It should be noted that the sequence of connection of the hill-shaped bent section 20 of the first (or third) embodiment and the valley-shaped bent section 19 of the second embodiment could be reversed.

Of course, if the first (or third) embodiment and the second embodiment are combined, a construction could be adopted in which the height distance of the hill shape of the first (or third) embodiment and the depth distance (or the height distance of the hill of the restraining member 18A) of the valley shape of the second embodiment could be made to be in a fixed proportional relationship, or the height distance of the hill or the height (or depth) of the other valley could be set, taking a shape in which the height (or depth) distance of the hill or valley of one or other is suitably reduced as standard.

Also, although, in the above embodiments, the conveyor was described taking a moving walkway as an example, the present invention could also be applied to escalators whereby passengers are transported that are arranged connecting the upper and lower floors of a building.

As described above, with a conveyor according to the present invention, since, if a construction of the step rollers 5 is adopted in which resilient members are interposed around their rotary shafts, the height of at least the central portion of the hill-shaped bent sections or the height of the central portion of the restraining member when a valley-shaped bent section is provided is compensated accordingly, generation of speed irregularity can be suppressed by causing the step rollers 5 to pass along the prescribed track without upwards or downwards movement thereof, while realizing a reduction in the overall thickness of the conveyor.

Also, thanks to the provision of recesses 3aa, 3ab, 3ac in the restraining member 18 or the step guide rail 3 facing the restraining member 18A, irrespective of whether or not resilient members are interposed around the rotary shafts of the step rollers 5, damage not only to the step rollers 5 but also to the restraining member 18 or the restraining member 18A and step guide rail 3 can be avoided, thereby making it possible to provide a conveyor offering excellent passenger comfort in which generation of speed irregularity in the steps 4 is suppressed.

Fourth Embodiment

A fourth embodiment of a conveyor according to the present invention provided with a hill-shaped bent section 20 in the step guide rail 3 will now be described with reference to FIG. 17, comparing this Figure with FIG. 2. Only the differences from the construction of the first embodiment will be particularly described.

FIG. 2 is a diagram corresponding to FIG. 5 of the first embodiment and is a layout view of a prior art conveyor. As shown in FIG. 2, a projecting hill-shaped bent section 20 is provided in the step guide rail 3 on the side of the steps 4, not shown, between the reference position S1 located in the vicinity of the driving sprocket wheel 9 and another reference position S2 adjacent to this reference position S1, of the plurality of reference positions S1, S2, S3, . . . that are present along the step guide rail 3; speed irregularities in the steps 4 can thereby be suppressed or absorbed. In this case, the step chain extends in the same straight line upstream and downstream of the step roller at the connecting section S2 with the hill-shaped bent section 20 and so is incapable of tracking even slight speed variations of the following step rollers; the connecting section S2 to the hill-shaped bent section 20 thus becomes a vertex of angle α with the result that shock is generated at the step rollers as they pass this point.

FIG. 17 is a layout diagram of a fourth embodiment. The height of the step guide rail 3 is offset by an amount δ below the height of the hill-shaped bent section 20 on the side of the hill-shaped bent section 20 furthest from the driving sprocket wheel 9, so the step chain no longer extends in the same straight line upstream and downstream of the step roller at the connecting section S2 with the hill-shaped bent section 20. The connecting section S2 with the hill-shaped bent section 21 thereby becomes a smooth shape with no folding.

The basic operation of a conveyor according to this fourth embodiment is described with reference to FIG. 17.

Referring to the three mutually adjacent step rollers of the step rollers 5 that are linked by the step chain 7, when the leading step roller 51a, approaching the driving sprocket wheel 9, has passed over the prescribed position (reference position S2) the speed of movement of this leading step roller 51a becomes slower than the average speed. Concurrently, when the second step roller 51b arrives at the hill-shaped bent section 20 between the reference positions, the height position of the second step roller 51b changes as it passes over the hill shape of this bent section 20.

Since the pitch (link length r) between the step rollers 5 is fixed, when the height position of the second step roller 51b changes, the third step roller 51c moves closer to the leading step roller 51a by an amount corresponding to the change of height position of the second step roller 51b, and the third step roller 51c is therefore accelerated. As a result, the amount of deceleration is cancelled by this amount of acceleration, so the speed of movement of the third step roller 51c is maintained at the average speed Vo.

FIG. 17 shows the condition when the second step roller 51b has advanced further, passing over the peak and then descending. As the height position becomes lower, since the pitch (link length r) between the step rollers 5 is fixed, the third step roller 51c is moved away from the leading step roller 51a by an amount corresponding to the change in height position of the second step roller 51b i.e. the third step roller 51c is decelerated. The amount of deceleration of the speed of movement is thus cancelled by the amount of this deceleration and the speed of movement of the step roller 51c is thereby maintained at the average speed Vo.

However, the height of the step guide rail 3 is offset (height δ) on the side of the hill-shaped bent section 20 furthest from the driving sprocket wheel, so the step chain no longer extends in the same straight line upstream and downstream of the step roller 51b at the connecting section S2 with the hill-shaped bent section 20. The third step roller 51c can therefore track speed changes by a slight vertical movement of the step roller 51b, so the speed of movement of the step roller 51c is maintained at the average speed Vo. The connecting section S2 with the hill-shaped bent section 20 thereby becomes a smooth shape with no folding, making it possible to avoid generation of impact vibration when the step rollers pass over this point.

As described above, with the conveyor 1 according to this fourth embodiment, since a hill-shaped bent section 20 is provided on the step guide rail 3 in a position between the reference positions, and the connecting section S2 with the hill-shaped bent section 20 has a smooth shape with no folding, generation of impact vibration when the step rollers pass this point can be avoided and excellent passenger comfort can be secured.

Also, even if offset (height δ) of the step guide rail 3 is provided on the side of the hill-shaped bent section 20 furthest from the driving sprocket wheel 9, the height of the hill-shaped bent section 20 is never more than about half i.e. δ/2 with respect to the driving sprocket wheel 9, so this is advantageous in achieving a reduction in thickness of the conveyor as a whole.

Fifth Embodiment

A fifth embodiment of a conveyor according to the present invention provided with a hill-shaped bent section 20 in the step guide rail 3 will now be described with reference to FIG. 18, comparing this Figure with FIG. 2. Only the differences from the construction of the first embodiment will be particularly described.

FIG. 18 is a layout diagram of a fifth embodiment. The step guide rail 3 is folded so as present a peak practically in the center of the hill-shaped bent section 20 on the side of the hill-shaped bent section 20 furthest from the driving sprocket wheel, so the step chain no longer extends in the same straight line upstream and downstream of the step roller at the connecting section S2 with the hill-shaped bent section 20. The connecting section S2 with the hill-shaped bent section 20 thus becomes a smooth shape with no folding.

The basic operation of a conveyor according to this fifth embodiment will now be described.

Referring to the three mutually adjacent step rollers of the step rollers 5 that are linked by the step chain 7, when the leading step roller 51a, approaching the driving sprocket wheel 9, has passed over the prescribed position (reference position S2) the speed of movement of this leading step roller 51a becomes slower than the average speed. Concurrently, when the second step roller 51b arrives at the hill-shaped bent section 20 between the reference positions, the height position of the second step roller 51b changes as it passes over the hill shape of this bent section 20.

Since the pitch (link length r) between the step rollers 5 is fixed, when the height position of the second step roller 51b changes, the third step roller 51c moves closer to the leading step roller 51a by an amount corresponding to the change of height position of the second step roller 51b, and the third step roller 51c is therefore accelerated. As a result, the amount of deceleration is cancelled by this amount of acceleration, so the speed of movement of the third step roller 51c is maintained at the average speed Vo.

However, the step guide rail 3 is folded so as to provide a peak at practically the center of the hill-shaped bent section 20 on the side of the hill-shaped bent section 20 furthest from the driving sprocket wheel 9, so the step chain no longer extends in the same straight line upstream and downstream of the step roller 51b at the connecting section S2 with the hill-shaped bent section 20. The third step roller 51c can therefore track speed changes by a slight vertical movement of the step roller 51b, so the speed of movement of the step roller 51c is maintained at the average speed Vo. The connecting section S2 with the hill-shaped bent section 20 thereby becomes a smooth shape with no folding, making it possible to avoid generation of impact vibration when the step rollers pass over this point.

As described above, with the conveyor 1 according to this fifth embodiment, since a hill-shaped bent section 20 is provided on the step guide rail 3 in a position between the reference positions, and the connecting section S2 with the hill-shaped bent section 20 has a smooth shape with no folding, generation of impact vibration when the step rollers pass this point can be avoided and excellent passenger comfort can be secured.

Also, since only a minute angle need be employed as the folding angle θ of the step guide rail 3 such as to produce a peak at the center of the hill-shaped bent section 20 on the side of the hill-shaped bent section 20 furthest from the driving sprocket wheel 9, this is advantageous in achieving reduced thickness of the conveyor as a whole.

Sixth Embodiment

A sixth embodiment of a conveyor according to the present invention provided with a valley-shaped bent section 17 in the step guide rail 3 will now be described with reference to FIG. 19, comparing this Figure with FIG. 3. In this case also, only the differences from the construction of the first embodiment will be particularly described.

FIG. 3 is a layout diagram of a prior art conveyor, being a diagram corresponding to FIG. 5 of the first embodiment. As shown in FIG. 3, of the plurality of reference positions S1, S2, S3, . . . that are present along the step guide rail 3, a valley-shaped bent section 20 is provided on the opposite side to the steps 4, not shown, between the reference position S2 that is positioned in the vicinity of the driving sprocket wheel 9 and another reference position S3 that is adjacent to this reference position S2 in order to suppress or absorb speed irregularities of the steps 4. In the case of this Figure, in contrast to the embodiments described above, the driving sprocket wheel 9 is rotating in the anti-clockwise direction, so the rotating rollers 51a, 51b, 51c move from left to right before engaging (meshing) with the driving sprocket wheel 9. However, in the case of this FIG. 3 also, a driving sprocket wheel 9 could of course be employed that rotates clockwise. The reason for this is of course that escalators or moving walkways etc may need to move to left or the right (in this Figure).

It may next be remarked that the step chain upstream and downstream of the step rollers at the connecting sections S2, S3 on both sides of the valley-shaped bent section 20 extends in a straight line, so the following step rollers are unable to track even slight speed variations. The connecting sections S2, S3 with the valley-shaped bent section 20 therefore constitute vertices of angle α' and shock is generated in the step rollers passing these points.

FIG. 19 is a layout diagram of a sixth embodiment. Since the step guide rail 3 is folded so as to present a valley fold in practically the center of the valley-shaped bent section 20 on the side of the valley-shaped bent section 20 furthest from the driving sprocket wheel, the step chain extends in a straight line upstream and downstream of the step rollers at the connecting sections S2, S3 with the valley-shaped bent section 20. The connecting sections S2, S3 with the valley-shaped bent section 20 thereby present a smooth shape with no folding.

The basic operation of a conveyor according to this sixth embodiment will now be described with reference to FIG. 19.

Referring to three mutually adjacent step rollers of the step rollers 5 linked by the step chain 7, as shown in FIG. 19, when the leading step roller 51a passes over a prescribed position (reference position S2) as it approaches the driving sprocket wheel 9, the speed of movement of this leading step roller 51a becomes slower than the average speed. Concurrently, when the second step roller 51b arrives at the valley-shaped bent section 20 between the reference positions, the height position of the second step roller 51b changes as it passes over the valley shape of this bent section 20.

Since the pitch (link length r) between the step rollers 5 is fixed, when the height position of the second step roller 51b changes, the third step roller 51c moves closer to the leading step roller 51a by an amount corresponding to the change of height position of the second step roller 51b, and the third step roller 51c is therefore accelerated. As a result, the amount of deceleration is cancelled by this amount of acceleration, so the speed of movement of the third step roller 51c is maintained at the average speed Vo.

However, since the step guide rail 3 is folded with an angle θ' so as to present a valley fold at practically the center of the valley-shaped bent section 20 on side of the valley-shaped bent section 20 furthest from the driving sprocket wheel, the step chain no longer extends in a straight line upstream and downstream of the step roller 51b at the connecting section S2 or S3 with the valley-shaped bent section 20. The third step roller 51c is thereby enabled to track speed changes by slight vertical movement of the step roller 51b, with the result that the speed of movement of the step roller 51c is maintained at the average speed Vo. The connecting sections S2, S3 with the valley-shaped bent section 20 thereby assume a smooth shape with no folding and this makes it possible to avoid generation of impact vibration when the step rollers pass these points.

As described above, with a conveyor 1 according to the sixth embodiment, since a construction is adopted in which a valley-shaped bent section 20 is provided on the step shaped guide rail 3 between reference positions S2 and S3 so that the connecting sections S2, S3 with the valley-shaped bent section 20 have a smooth shape with no folding, generation of impact vibration when the step rollers pass these points can be avoided, making it possible to secure excellent passenger comfort.

Also, since the step guide rail 3 has a valley fold in practically the center of the valley-shaped bent section 20 on the side of the valley-shaped bent section 20 furthest from the driving sprocket wheel, this is advantageous in achieving reduction of the thickness of the conveyor as a whole.

Apart from the above, the present invention is not restricted to the above embodiments and could be put into practice in various modified ways without departing from its gist.

INDUSTRIAL APPLICATION

With a conveyor according to the present invention, when resilient members are interposed around the shafts of the step rollers, even if compressive deformation of the resilient members of these step rollers occurs in the hill-shaped bent section of the step guide rail or in a restraining member corresponding to a valley-shaped bent section due to the action of tension, since the height of the central section of the hill-shaped bent section or the height of the central section of the restraining member is elevated by an amount corresponding to the thickness of this compressive deformation, the central axis of rotation of the step rollers can be made to follow the prescribed track that was pre-set for suppression of speed irregularity and suppression of speed irregularities can thereby be achieved.

Also, in a conveyor provided with a hill-shaped bent section between reference positions, since a restraining member is provided in order to guide the step rollers into a prescribed position without allowing the step rollers to ride up and a recess is provided in the step guide rail facing this restraining member, gripping of the step rollers from above and below is avoided. As a result, the step rollers are able to execute smooth rolling movement along the surface of the restraining member and damage not only to the step rollers but also to the restraining member and/or step guide rail can thus be avoided.

Furthermore, since a restraining member is provided that contacts the step rollers in a position facing a valley-shaped bent section of the step guide rail and a recess is formed in the valley-shaped bent section of the step guide rail, gripping of the step rollers from above and below is avoided. As a result, the step rollers are able to execute smooth rolling movement along the surface of the restraining member and damage not only to the step rollers but also to the restraining member and/or step guide rail can thus be avoided.

Also, since, in a conveyor provided with a hill-shaped bent section between a reference position and a drive starting point, a restraining member is provided contacting the step rollers in order to prevent riding up of the step rollers and suppress generation of speed irregularities of the steps and a recess is provided in the step guide rail in a position corresponding to this restraining member, gripping of the step rollers from above and below is avoided. As a result, the step rollers are able to execute smooth rolling movement along the surface of the restraining member and damage not only to the step rollers but also to the restraining member and/or step guide rail can thus be avoided.

Furthermore, since, in a conveyor provided with a hill-shaped bent section between reference positions, the height of the step guide rail is offset by less than the height of the hill-shaped bent section on the side of the hill-shaped bent section furthest from the driving sprocket wheel, the step chain no longer extends in a straight line upstream and downstream of the step roller at the connecting section with the hill-shaped bent section. The connecting section with the hill-shaped bent section thus has a smooth shape with no folding, so generation of impact vibration when the step rollers pass this point can be avoided.

Furthermore, since, in a conveyor provided with a hill-shaped bent section between reference positions, the step guide rail is folded so as to present a peak in practically the center of the hill-shaped bent section on the side of the hill-shaped bent section furthest from the driving sprocket wheel, the step chain no longer extends in a straight line upstream and downstream of the step roller at the connecting section with the hill-shaped bent section. The connecting section with the hill-shaped bent section thus has a smooth shape with no folding, so generation of impact vibration when the step rollers pass this point can be avoided.

Furthermore, since, in a conveyor provided with a valley-shaped bent section between reference positions, the step guide rail is folded so as to present a valley fold in practically the center of the valley-shaped bent section on the side of the valley-shaped bent section furthest from the driving sprocket wheel, the step chain no longer extends in a straight line upstream and downstream of the step roller at the connecting section with the valley-shaped bent section. The connecting section with the valley-shaped bent section thus has a smooth shape with no folding, so generation of impact vibration when the step rollers pass this point can be avoided.

The invention claimed is:

1. A conveyor having
a plurality of steps having a step roller,
a step chain linking said step rollers with a prescribed pitch,
a rotary drive device that generates a drive force for moving said steps in a prescribed direction, and
a driving sprocket wheel rotated by receiving said drive force of said rotary drive device, and that transmits said drive force to said step chain,
said conveyor comprising:
a step guide rail whereby, if a pitch circle speed of said driving sprocket wheel is defined as Vt, an average speed of said step roller that is moved, linked with said step chain is defined as Vo, and positions at which a speed of said step roller decreases from Vt to Vo are defined as reference positions, said step rollers are guided by providing a hill-shaped bent section between a reference position, of a plurality of said reference positions that exist, positioned in a vicinity of said driving sprocket wheel and another reference position adjacent to said reference position; and
a restraining member provided so as to abut said step roller in a position facing a position upstream of a location where said hill-shaped bent section is provided;
wherein said step rollers are formed having a resilient member about a shaft and said step guide rail is formed with a height of a central region of said hill-shaped bent section elevated by an amount corresponding to an amount of compression of said resilient member of said step roller in a radial direction.

2. The conveyor according to claim 1,
wherein if said step roller having speed irregularity, which is said step roller that is located between said bent section and said driving sprocket wheel is defined as an irregular speed roller, said step roller that may be anticipated to have a fixed speed and that is a second step roller along said step guide rail, on an other side of said bent section from said irregular speed roller is defined as a fixed speed roller and a track that is followed by a point of intersection of a circle drawn with a radius of a link length of said step chain from a center of said irregular speed roller and a circle that is drawn with a radius of a link length of said step chain from a center of said fixed speed roller, when movement in an amount of one pitch takes place of said irregular speed roller and said fixed speed roller, is defined as a roller center track,
said bent section of said step guide rail is formed in a shape imitating said roller center track.

3. The conveyor according to claim 1,
wherein if said step roller having speed irregularity, which is said step roller that is located between said bent section and said driving sprocket wheel is defined as an irregular speed roller, said step roller that is allowed to have a minute speed irregularity and that is a second step roller on another side of said bent section from said irregular speed roller is defined as a practically fixed speed roller and a track that is followed by a point of intersection of a circle drawn with a radius of a link length of said step chain from a center of said irregular speed roller and a circle that is drawn with a radius of a link length of said step chain from a center of said practically fixed speed roller, when movement in an amount of one pitch takes place of said irregular speed roller and said practically fixed speed roller, is defined as a roller center track,
said bent section of said step guide rail is formed in a shape imitating said roller center track.

4. The conveyor according to claim 1,
wherein said step guide rail is provided with said bent section in a vicinity of said driving sprocket wheel on a return side.

5. The conveyor according to claim 1,
further comprising:
a driven sprocket wheel of practically a same diameter as said driving sprocket wheel;
a chain tensioning mechanism that applies tension to said step chain by biasing said driven sprocket wheel in a direction away from said driving sprocket wheel; and
a moveable rail receiving said tension from said chain tensioning mechanism, and capable of movement in a direction away from said driving sprocket wheel, linked with said driven sprocket wheel.

6. The conveyor according to claim 5,
wherein said moveable rail has a circular section of practically a same diameter as said driving sprocket wheel.

7. A conveyor having
a plurality of steps having a step roller,
a step chain linking said step rollers with a prescribed pitch,
a rotary drive device that generates a drive force for moving said steps in a prescribed direction,
a driving sprocket wheel rotated by receiving a drive force of said rotary drive device, and that transmits said drive force to said step chain;
said conveyor comprising:
a step guide rail whereby, if a pitch circle speed of said driving sprocket wheel is defined as Vt, an average speed of said step roller that is moved, linked with said step chain is defined as Vo, and positions at which a speed of said step roller decreases from Vt to Vo are defined as reference positions, said step rollers are guided by providing a hill-shaped bent section between a reference position, of a plurality of said reference positions that exist, positioned in a vicinity of said driving sprocket wheel and a drive starting point on said driving sprocket wheel separated by a link length of said step chain from said reference position; and
a restraining member provided so as to abut said step roller in a position facing a position upstream of a location where said hill-shaped bent section is provided;
wherein said step rollers are formed having a resilient member about a shaft and said step guide rail is formed with a height of a central region of said hill-shaped bent section elevated by an amount corresponding to an amount of compression of said resilient member in a radial direction of said step roller.

8. A conveyor having
a plurality of steps having a step roller,
a step chain linking said step rollers with a prescribed pitch,
a rotary drive device that generates a drive force for moving said steps in a prescribed direction,
a driving sprocket wheel rotated by receiving said drive force of said rotary drive device, and that transmits said drive force to said step chain;
said conveyor comprising:
a step guide rail whereby, if a pitch circle speed of said driving sprocket wheel is defined as Vt, an average speed of said step roller that is moved, linked with said step chain is defined as Vo, and positions at which a speed of said step roller decreases from Vt to Vo are defined as reference positions, said step rollers are guided by providing a valley-shaped bent section between a reference position, of a plurality of said reference positions that exist, positioned in a vicinity of said driving sprocket wheel and another reference position adjacent to said reference position; and
a restraining member provided so as to abut said step roller in a position facing said valley-shaped bent section;
wherein said step rollers are formed having a resilient member about a shaft and said restraining member is formed with a height of a central region thereof elevated towards said valley-shaped bent section by an amount corresponding to an amount of compression of said resilient member in a radial direction of said step roller.

9. A conveyor having
a plurality of steps having a step roller,
a step chain linking said step rollers with a prescribed pitch,
a rotary drive device that generates a drive force for moving said steps in a prescribed direction,
a driving sprocket wheel rotated by receiving said drive force of said rotary drive device, and that transmits said drive force to said step chain,
said conveyor comprising:
a step guide rail whereby, if a pitch circle speed of said driving sprocket wheel is defined as Vt, an average speed of said step roller that is moved, linked with said step chain is defined as Vo, and positions at which a speed of said step roller decreases from Vt to Vo are defined as reference positions, said step rollers are guided by providing a hill-shaped bent section between a reference position, of a plurality of said reference positions that exist, positioned in a vicinity of said driving sprocket wheel and another reference position adjacent to said reference position; and
a restraining member provided so as to abut said step roller in a position facing a position upstream of a location where said hill-shaped bent section is provided;
wherein said step guide rail is formed with a recess in a surface facing said restraining member.

10. The conveyor according to claim 9,
wherein said restraining member is formed with an outwardly inclined tapered shape at both ends in a step movement direction;
said recess of said step guide rail is formed with an inwardly inclined tapered shape at a position corresponding to both said ends; and
said step rollers are arranged so as to pass with practically uniform gaps between said restraining member and said step guide rail at positions corresponding to both said ends.

11. The conveyor according to claim 10,
wherein said step rollers are formed with resilient members around the shafts thereof; and
said step guide rail is formed with a height of a center section of said hill-shaped bent section elevated by an amount corresponding to an amount of compression of said resilient members in a radial direction of said step rollers.

12. The conveyor according to claim 9,
wherein said step rollers are formed with resilient members around said shaft thereof and said step guide rail is formed with a height of a center section of said hill-shaped bent section elevated by an amount corresponding to an amount of compression of said resilient members in a radial direction of said step rollers.

13. The conveyor according to claim 12,
wherein said restraining member is formed with a surface thereof that contacts said step rollers made to project in a center section thereof by an amount corresponding to an amount of compression of said resilient members in a radial direction of said step rollers.

14. A conveyor having
a plurality of steps having a step roller,
a step chain linking said step rollers with a prescribed pitch,
a rotary drive device that generates a drive force for moving said steps in a prescribed direction,
a driving sprocket wheel rotated by receiving said drive force of said rotary drive device, and that transmits said drive force to said step chain;
said conveyor comprising:
a step guide rail whereby, if a pitch circle speed of said driving sprocket wheel is defined as Vt, an average speed of said step roller that is moved, linked with said step chain is defined as Vo, and positions at which a speed of said step roller decreases from Vt to Vo are defined as reference positions, said step rollers are guided by providing a valley-shaped bent section between a reference position, of a plurality of said reference positions that exist, positioned in a vicinity of said driving sprocket wheel and another reference position adjacent to said reference position; and
a restraining member provided so as to abut said step roller in a position facing said valley-shaped bent section;
wherein said step guide rail is formed with a recess in said valley-shaped bent section.

15. The conveyor according to claim 14,
wherein said restraining member is formed with an outwardly inclined tapered shape at both ends in a step movement direction;
said recess of said step guide rail is formed with an inwardly inclined tapered shape at a position corresponding to both ends of said restraining member; and
said step rollers are arranged so as to pass with practically uniform gaps between said restraining member and said step guide rail at positions of both ends formed with said tapered shapes.

16. The conveyor according to claim 14,
wherein said step rollers are formed with resilient members around said shaft thereof and said restraining member is formed with a surface thereof that contacts said step rollers made to project in a center section thereof by an amount corresponding to an amount of compression of said resilient members in a radial direction of said step rollers.

17. A conveyor having
a plurality of steps having a step roller,
a step chain linking said step rollers with a prescribed pitch,
a rotary drive device that generates a drive force for moving said steps in a prescribed direction,
a driving sprocket wheel rotated by receiving said drive force of said rotary drive device, and that transmits said drive force to said step chain;
said conveyor comprising:
a step guide rail whereby, if a pitch circle speed of said driving sprocket wheel is defined as Vt, an average speed of said step roller that is moved, linked with said step chain is defined as Vo, and positions at which a speed of said step roller decreases from Vt to Vo are defined as reference positions, said step rollers are guided by providing a hill-shaped bent section between said reference position, of a plurality of said reference positions that exist, positioned in a vicinity of said driving sprocket wheel and a drive starting point on said driving sprocket wheel separated by a link length of said step chain from said reference position; and
a restraining member provided so as to abut said step roller in a position facing a position upstream of a location where said hill-shaped bent section is provided;
wherein said step guide rail is formed with a recess in a surface facing said restraining member.

18. A conveyor having
a plurality of steps having a step roller,
a step chain linking said step rollers with a prescribed pitch,
a rotary drive device that generates a drive force for moving said steps in a prescribed direction,
a driving sprocket wheel rotated by receiving said drive force of said rotary drive device, and that transmits said drive force to said step chain;
said conveyor comprising:
a step guide rail whereby, if a pitch circle speed of said driving sprocket wheel is defined as Vt, an average speed of said step roller that is moved, linked with said step chain is defined as Vo, and positions at which a speed of said step roller decreases from Vt to Vo are defined as reference positions, said step rollers are guided by providing a hill-shaped bent section between a reference position, of a plurality of said reference positions that exist, positioned in a vicinity of said driving sprocket wheel and another reference position adjacent to said reference position; and
a restraining member provided so as to abut said step roller in a position facing a position upstream of a location where said hill-shaped bent section is provided;
wherein a height of said step guide rail is offset to less than a height at said hill-shaped bent section on a side of said hill-shaped bent section further from said driving sprocket wheel.

19. A conveyor having
a plurality of steps having a step roller,
a step chain linking said step rollers with a prescribed pitch,
a rotary drive device that generates a drive force for moving said steps in a prescribed direction,
a driving sprocket wheel rotated by receiving said drive force of said rotary drive device, and that transmits said drive force to said step chain;
said conveyor comprising:
a step guide rail whereby, if a pitch circle speed of said driving sprocket wheel is defined as Vt, an average speed of said step roller that is moved, linked with said step chain is defined as Vo, and positions at which a speed of said step roller decreases from Vt to Vo are defined as reference positions, said step rollers are guided by providing a hill-shaped bent section between a reference position, of a plurality of said reference positions that exist, positioned in a vicinity of said driving sprocket wheel and another reference position adjacent to said reference position; and
a restraining member provided so as to abut said step roller in a position facing a position upstream of a location where said hill-shaped bent section;
wherein said step guide rail is folded so as to constitute a hill fold in practically a center of said hill-shaped bent section.

20. A conveyor having
a plurality of steps having a step roller,
a step chain linking said step rollers with a prescribed pitch;
a rotary drive device that generates a drive force for moving said steps in a prescribed direction,
a driving sprocket wheel rotated by receiving said drive force of said rotary drive device, and that transmits drive force to said step chain, said conveyor comprising:

a step guide rail whereby, if a pitch circle speed of said driving sprocket wheel is defined as Vt, an average speed of said step roller that is moved, linked with said step chain is defined as Vo, and positions at which a speed of said step roller decreases from Vt to Vo are defined as reference positions, said step rollers are guided by providing a valley-shaped bent section between a reference position, of a plurality of said reference positions that exist, positioned in a vicinity of said driving sprocket wheel and another reference position adjacent to said reference position; and a restraining member provided so as to abut said step roller in a position facing said valley-shaped bent section;

wherein said step guide rail is folded so as to constitute a valley fold in practically a center of said valley-shaped bent section.

* * * * *